United States Patent
Hafter et al.

(10) Patent No.: US 12,388,394 B2
(45) Date of Patent: Aug. 12, 2025

(54) INTERLOCKING FRAME FOR SOLAR PANELS

(71) Applicant: Origami Solar, Inc., Sacramento, CA (US)

(72) Inventors: Eric L. Hafter, Sacramento, CA (US); John C. Patton, Roseville, CA (US)

(73) Assignee: Origami Solar, Inc., Sacramento, CA (US)

( * ) Notice: Subject to any disclaimer, the term of this patent is extended or adjusted under 35 U.S.C. 154(b) by 0 days.

(21) Appl. No.: 18/556,188

(22) PCT Filed: Apr. 19, 2022

(86) PCT No.: PCT/US2022/025383
§ 371 (c)(1),
(2) Date: Oct. 19, 2023

(87) PCT Pub. No.: WO2022/225958
PCT Pub. Date: Oct. 27, 2022

(65) Prior Publication Data
US 2024/0186944 A1     Jun. 6, 2024

Related U.S. Application Data

(60) Provisional application No. 63/176,803, filed on Apr. 19, 2021.

(51) Int. Cl.
*H02S 30/10*     (2014.01)
*F16B 5/12*     (2006.01)

(52) U.S. Cl.
CPC .............. *H02S 30/10* (2014.12); *F16B 5/121* (2013.01)

(58) Field of Classification Search
None
See application file for complete search history.

(56) References Cited

U.S. PATENT DOCUMENTS

| | | | | |
|---|---|---|---|---|
| 7,487,771 | B1 * | 2/2009 | Eiffert | H02S 30/10 136/246 |
| 2014/0076399 | A1 * | 3/2014 | Huang | H02S 30/10 136/259 |

(Continued)

FOREIGN PATENT DOCUMENTS

| | | | | |
|---|---|---|---|---|
| CN | 117222852 A | 12/2023 | | |
| DE | 102015121615 A1 * | 6/2017 | | F24S 25/20 |

(Continued)

OTHER PUBLICATIONS

U.S. Appl. No. 63/176,803, filed Apr. 19, 2021. First named inventor: Hafter.

(Continued)

*Primary Examiner* — Steven M Marsh
(74) *Attorney, Agent, or Firm* — Santangelo Law Offices P.C.

(57) ABSTRACT

A frame precursor structure (201) is provided for use in forming a frame (101) that encloses at least a portion of a panel (190). The frame precursor structure may include a framework material having a first end (210) and a second end (220), the first and second ends defining a lengthwise dimension. A lengthwise fold (102) may define an intersection of a frame sidewall (103) with a bottom flange (104). A first corner bend precursor axis (212) on the frame sidewall may define the interface of a first frame section (201-1) with a second frame section (201-2). The sidewall at the first corner bend precursor axis (212) may be bendable along its height axis. The bottom flange may include a first notch (212N) at the first corner bend precursor axis (212).

21 Claims, 26 Drawing Sheets

(56) References Cited

U.S. PATENT DOCUMENTS

2014/0230877 A1     8/2014   Goldberg et al.
2015/0256120 A1     9/2015   Anderson et al.

FOREIGN PATENT DOCUMENTS

| EP | 2267792 A1 | * | 12/2010 | ............. F24S 25/20 |
| --- | --- | --- | --- | --- |
| EP | 3751624 A1 | * | 12/2020 | ........... H01L 31/042 |
| EP | 4327032 | | 2/2024 | |
| KR | 1020140036105 A | | 3/2014 | |
| WO | WO-2009119775 A1 | * | 10/2009 | ............. F24S 25/20 |
| WO | 2010129420 A1 | | 11/2010 | |
| WO | 2020252091 A1 | | 12/2020 | |
| WO | 2022225958 A2 | | 10/2022 | |

OTHER PUBLICATIONS

International PCT Patent Application No. PCT/US2022/025383 filed Apr. 19, 2022. International Search Report dated Oct. 6, 2022. 4 pages.

International PCT Patent Application No. PCT/US2022/025383 filed Apr. 19, 2022. Written Opinion dated Oct. 6, 2022. 14 pages.

Fampat Machine Translation of JP10308522 A provided with the Written Opinion of the International Searching Authority. Obtained Aug. 10, 2022. 6 pages.

International PCT Patent Application No. PCT/US2022/025383 filed Apr. 19, 2022. First Named Inventor: Hafter.

Counterpart European Patent Application No. 22792331.5, filed Oct. 23, 2023. Examination Report dated Jan. 14, 2025, 10 pages.

* cited by examiner

INTERLOCKING FRAME FOR SOLAR PANELS

CROSS-REFERENCE TO RELATED APPLICATION

This application is the United States National Phase of PCT International Application No. PCT/US2022/025383, filed Apr. 19, 2022, which claims priority to and the benefit of U.S. Provisional Patent Application No. 63/176,803 filed on Apr. 19, 2021, entitled "INTERLOCKING FRAME FOR SOLAR PANELS" the contents of each above mentioned application and any priority case are hereby incorporated by reference in their entirety.

TECHNICAL FIELD

The present disclosure relates to various embodiments for frame structures for panels such as solar panels.

BACKGROUND

Photovoltaic solar panels for residential and commercial use are relatively large and heavy. For example, a typical rectangular solar panel may weigh about 20-30 kg, have a width of about 1 meter, a length of about 1.6 to 2.5 meters, and a thickness of about 3 to 5 cm. A photovoltaic solar panel may typically be a multilayer laminated structure (sometimes referred to as a PV laminate) and may include photovoltaic cells encapsulated between a top glass and a protective back-sheet. A solar panel can further include appropriate wiring and junctions so that solar-generated electricity (typically DC) may be transmitted to a desired load, grid, or energy storage unit. While having some physical toughness, significant additional strength to the panel may be provided by including it in a frame. A frame may allow for easy attaching of a photovoltaic solar panel to a rack. A framed PV laminate is sometimes referred to as a PV module.

Over the years, the cost of solar panels has decreased perhaps due to a decrease in the material and manufacturing costs and even an increased efficiency of the solar cells. However, in order to further expand the use of renewable solar energy, there is a continuing desire to further reduce costs and simplify the manufacture of frames.

DISCLOSURE OF INVENTION

The present application includes a variety of aspects, which may be selected in different combinations based upon the particular application or needs to be addressed. In various embodiments, the application may include a frame precursor structure for use in forming a frame that encloses at least a portion of a panel. The frame precursor structure may include a framework material having a first end and a second end, the first and second ends defining a lengthwise dimension. A lengthwise fold may define an intersection of a frame sidewall with a bottom flange. A first corner bend precursor axis on the frame sidewall may define the interface of a first frame section with a second frame section. The sidewall at the first corner bend precursor axis may be bendable along its height axis. The bottom flange may include a first notch at the first corner bend precursor axis. The bottom flange on one side of the first notch may include a locking element and the bottom flange on the other side of the first notch may include an opening perhaps designed to receive the locking element upon bending the frame precursor structure to form the frame.

It may be an object of application to provide a reduction in frame costs and installation costs perhaps due to a reduction in the costs for the materials of the improved frames.

It may be another object of the application to provide a reduction in costs for the manufacturing of the improved frames.

Yet another object of the application may include a reduction in costs for the installation of the improved frames.

An object of the application may include improved frame strength.

Another object of the application may include improved durability of framed panel structures.

In yet another object the application may provide a higher manufacturing yield and even a higher installation yield, or some other advantage.

Naturally, further objects, goals and embodiments of the application are disclosed throughout other areas of the specification, claims, and drawings.

MODE(S) FOR CARRYING OUT THE INVENTION

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and embodiments should not be construed to limit embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

It is to be understood that the drawings are for purposes of illustrating the concepts of the disclosure and may not be to scale. Additional details of certain embodiments of the application may be found in PCT application PCT/US2020/037092 filed on Jun. 10, 2020 and published as WO2020/252091A1, the entire contents of which are incorporated herein by reference for all purposes.

Figure 1A:
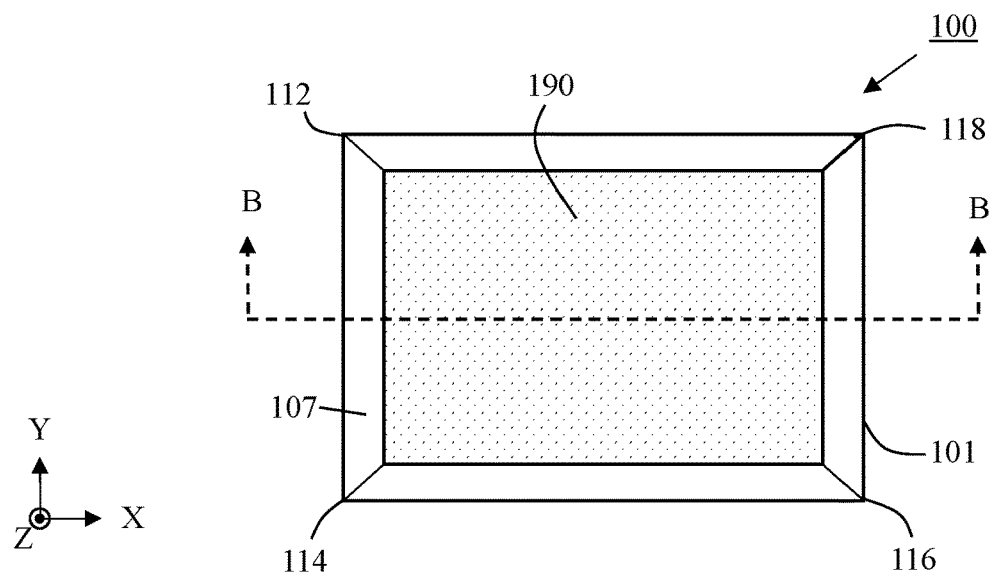
FIG. 1A is a plan view of a non-limiting example of a framed panel structure according to some embodiments.
Figure 1B:
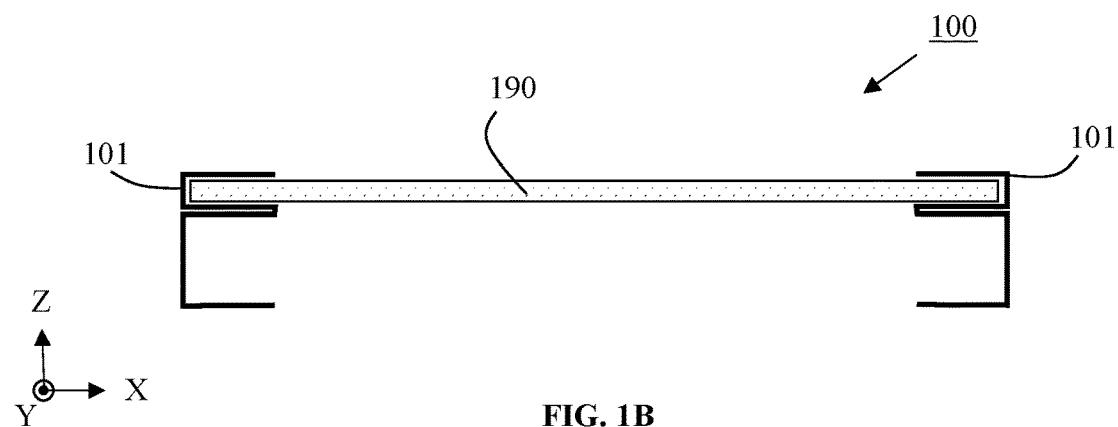
FIG. 1B is a cross-sectional view of a non-limiting example of a framed panel structure along cutline B-B of FIG. 1A according to some embodiments.
Figure 1C:
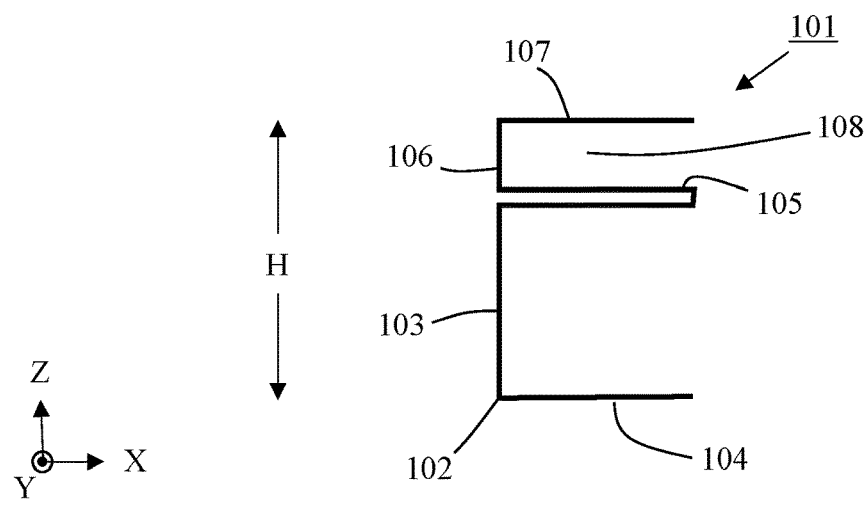
FIG. 1C is the cross-sectional view from FIG. 1B showing a non-limiting example of just the frame according to some embodiments.

FIG. 1A is a plan view of a non-limiting example of a framed panel structure 100 (e.g., a framed solar panel structure or PV module) including panel 190 (e.g., a solar panel) encased in a frame 101 according to some embodiments. FIG. 1B is a cross-sectional view of the framed panel structure 100 along cutline B-B. For added perspective, XYZ coordinate axes are also shown. FIG. 1C is the cross-sectional view as in FIG. 1B but excluding the panel to further illustrate some of the features of the frame 101.

In some embodiments and as discussed in more detail herein, frame 101 may be formed from substantially a single frame precursor structure that is bent in predetermined regions to accommodate three corners of the solar panel, perhaps with the fourth corner forming a joint between two ends of the frame precursor structure. That is, frame 101 may in some cases include a first corner bend 112 corresponding to a first corner of panel 190, a second corner bend 114 corresponding to a second corner of panel 190, a third corner bend 116 corresponding to a third corner of panel 190, and even a corner joint 118 corresponding to a fourth corner of panel 190.

Referring to FIGS. 1B and 1C, frame 101 may include a framework material that has been cut and folded into a desired shape. Frame 101 may be characterized by a height H and may include a lengthwise fold 102 defining an intersection of a frame sidewall 103 with a bottom flange 104. The frame may further include a series of folds to form a panel containment structure including a lower shelf 105, a pocket wall 106, a top lip 107, and perhaps even a pocket region 108. In some embodiments, the bottom flange may generally represent, or be provided at, the base of the frame or framed panel structure. The panel 190 may be received into a portion of the pocket region and secured in place, optionally with a sealant that may have adhesive properties (not shown). Some non-limiting examples of sealants may include curable liquid silicone, urethane, epoxy, resin, any other liquid seal, or the like. Alternatively, or in combination, a pressure sensitive adhesive tape may optionally be used to secure the panel in the pocket region. In some embodiments, a panel containment structure may include only a lower shelf, or alternatively, only a lower shelf and a pocket wall. In such embodiments, the panel may optionally be secured in place using a sealant or pressure sensitive adhesive as described above. In some embodiments, only some of the frame sections may include a panel containment structure, for example, only frame sections on one set of opposing sides of a rectangular or square panel.

Although FIGS. 1B and 1C show non-limiting examples where the bottom flange, the lower shelf, and the top lip all extend away from the frame sidewall to an equal extent, any of these features may be varied such as shorter or longer than the others or the like. The angle between the frame sidewall and bottom flange is shown to be approximately 90°, e.g., in a range of about 85° to about 95°, but in some other embodiments, the angle may be outside of that range, e.g., in a range of about 45° to about 135° perhaps depending on other features of the structure and overall system design. In some embodiments, the lower shelf and bottom flange may remain approximately parallel, e.g., within about 40°, alternatively within about 30°, 20°, 15°, 10°, or 5°, regardless of the angle between the frame sidewall and the bottom flange. The top lip is shown to be parallel with the lower shelf, but in some embodiments, it may be at a slight angle or curved at the end perhaps so that the opening of the pocket region is larger or smaller than the pocket wall. In the embodiment illustrated in FIGS. 1B and 1C, the lower shelf 105 is shown as being formed from, or including multiple layers of, framework material. In some embodiments, any or all of the frame features (e.g., the sidewall, bottom flange, lower shelf, pocket wall, upper lip, support wall, or the like) may be formed from or include multiple layers of framework material. In some cases, multiple layers may provide increased strength to the frame.

FIGS. 1A, 1B, and 1C illustrate a conventional rectangular panel shape that may be common for solar panels. However, there is no particular limitation on the shape of the panel which may be any shape such as a polygon having 3, 4, 5, 6 7, 8 or more sides. The sides of the polygon may have the same length, or alternatively some sides may be longer or shorter. The corner angles of the polygon may all be the same, or alternatively, some corner angles may have smaller or larger angles than others.

Making the frame or a frame section substantially from a single piece of framework material may have considerable manufacturing, assembly, and cost advantages. However, the panel containment structure in some embodiments may be formed using alternative methods and materials. For example, the shelf may be a piece of shelf material bonded (e.g., welded, brazed, soldered, glued, riveted, or the like) to an upper portion of the frame sidewall. Similarly, the top lip may include a piece of top lip material bonded to the top of the frame structure. Alternatively, the entire panel containment structure may be a separate structure designed to sit on, slip over, or otherwise mate with the frame sidewall. As discussed elsewhere herein, rather than one elongated piece of framework material, a 4-sided frame may be formed from 2, 3, or even 4 separate frame sections (or more or if the frame has more than 4 sides). Although not illustrated in FIGS. 1A-1C, the frame or framed panel structure may further include a support wall extending from the bottom flange to the panel containment structure or to the frame sidewall, as described in more detail elsewhere herein. It should be noted that, throughout this disclosure, an upper portion and top lip may in some cases refer to general positions relative to the bottom flange or the base of the frame, and does not necessarily indicate a position or orientation in the final framed panel structure, which may be oriented in a manner other than horizontal as shown in FIG. 1B (e.g., at an angle, on its side, or even parietally or fully inverted).

Figure 2A:
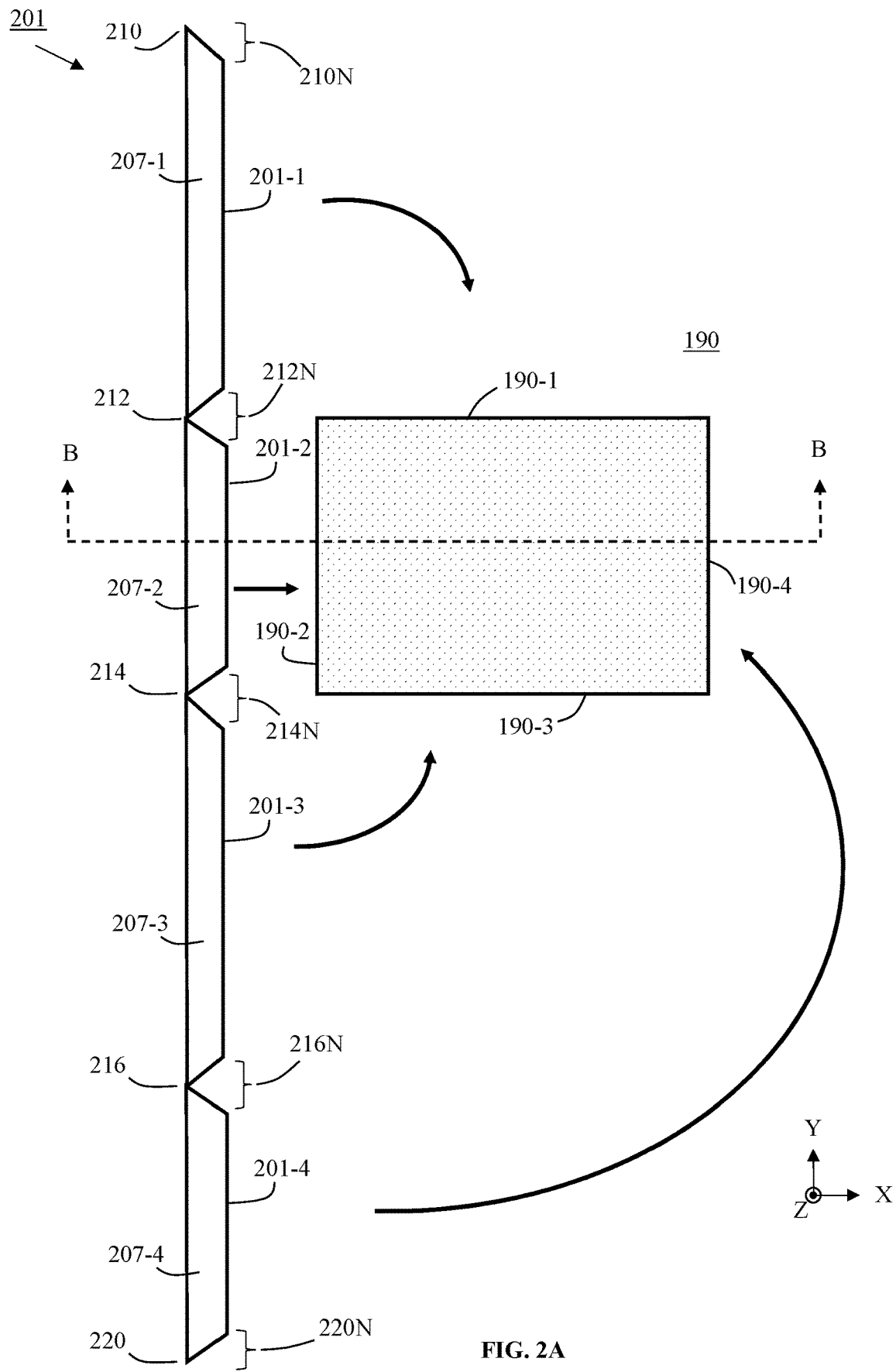
FIG. 2A is a plan view of a non-limiting example of a frame precursor structure and a panel prior to assembling a framed panel structure according to some embodiments.
Figure 2B:
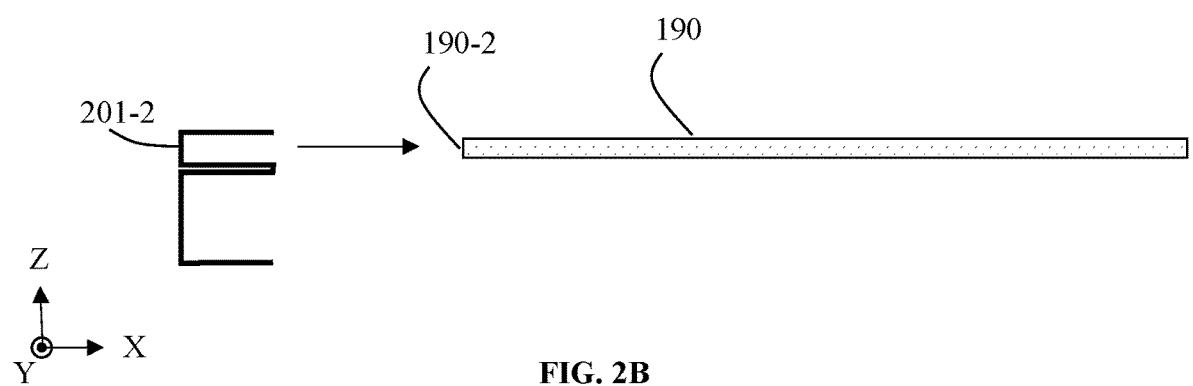
FIG. 2B is a cross-sectional view of a non-limiting example of a frame precursor structure and a panel along cutline B-B of FIG. 2A according to some embodiments.

FIG. 2A is a plan view schematic to generally illustrate construction of a framed panel structure according to some embodiments. FIG. 2B is a cross-sectional view of FIG. 2A along cutline B-B. A frame precursor structure 201 may be formed from framework material characterized by an average thickness. Frame precursor structure 201 may include a first end 210 and a second end 220 defining a lengthwise dimension. The frame precursor structure 201 may include a first frame section 201-1 designed to fit with or attach to first panel edge 190-1 of panel 190, a second frame section 201-2 designed to fit with or attach to second panel edge 190-2, a third frame section 201-3 designed to fit with or attach to third panel edge 190-3, and even a fourth frame section 201-4 designed to fit with or attach to fourth panel edge 190-4. Frame precursor structure 201 may include a first corner bend precursor axis 212 between the first and second frame sections and may be designed to bend along the Z axis (the height axis) of the frame sidewall. In a finished framed panel structure, first corner bend precursor axis 212 can correspond to first corner bend 112 (FIG. 1A). Similarly, frame precursor structure 201 may include second and third corner bend precursor axes 214 and 216, respectively. In some embodiments, the intersection of first panel edge 190-1 with second panel edge 190-2 may be characterized as a first panel corner. Similarly, the intersection of second panel edge 190-2 with third panel edge 190-3 may be characterized as a second panel corner, the intersection of third panel edge 190-3 with fourth panel edge 190-4 may be characterized as a third panel corner, and the intersection of fourth panel edge 190-4 with first panel edge 190-2 may be characterized as a fourth panel corner.

Figure 2C:
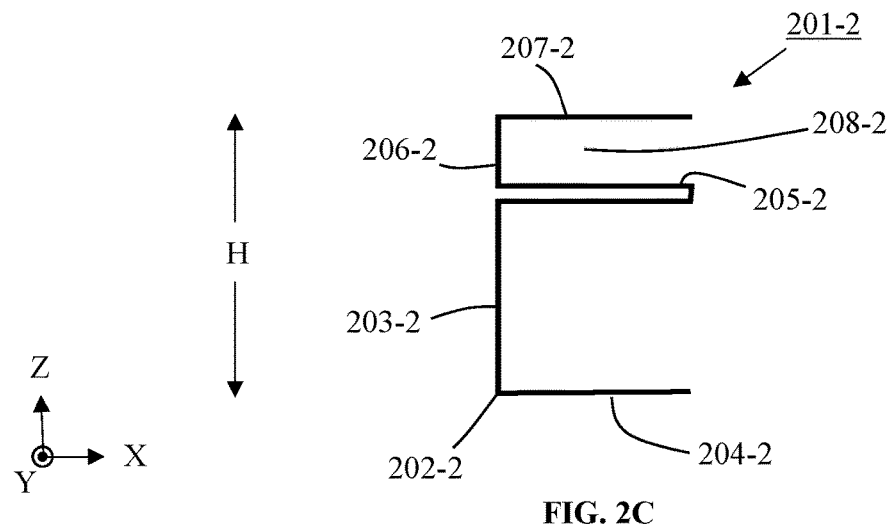
FIG. 2C is the cross-sectional view from FIG. 2B showing a non-limiting example of just the frame precursor structure according to some embodiments.

Referring to FIG. 2B, the cross-sectional structure correlates to that of FIG. 1B for the finished frame. FIG. 2C is the cross-sectional view as in FIG. 2B but excluding the panel to further illustrate some non-limiting examples of the features of the frame precursor structure, in particular, frame section 201-2. Here, second frame section 201-2 may be characterized by height H and may include a lengthwise fold 202-2 perhaps defining an intersection of a frame sidewall 203-2 with a bottom flange 204-2. The second frame section may include a series of folds to form a panel containment structure including a lower shelf 205-2, a pocket wall 206-2, a top lip 207-2 and perhaps even a pocket region 208-2. In some embodiments, the bottom flange may generally represent, or be provided at, the base of the frame section. Panel edge 190-2 of panel 190 may be received into a portion of the pocket region and secured in place, optionally with some sealant (not shown). In some embodiments, each frame section of the frame precursor structure may have substantially the same cross-sectional structure as shown for the second frame section 201-2 in FIG. 2B. But in some other embodiments, there may be differences between cross-sectional structures of two or more of frame sections. In the embodiment illustrated in FIGS. 2B and 2C, the lower shelf 205-2 is shown as being formed from, or including multiple layers of, framework material. In some embodiments, any or all of the frame section features (e.g., the sidewall, bottom flange, lower shelf, pocket wall, upper lip, support wall, or the like) may be formed from or include multiple layers of framework material. In some cases, multiple layers may provide increased strength to the frame.

In order to accommodate bending of the frame precursor structure to enclose the panel, the frame precursor structure may include a series of notches (212N, 214N, 216N) in the top lip, the lower shelf, and even the bottom flange, such notches corresponding to first, second, and third corner bend precursor axes, 212, 214, and 216, respectively. In FIG. 2A, the notches are only visible in the top lip (between top lip 207-1 and top lip 207-2, between top lip 207-2 and top lip 207-3, and between top lip 207-3 and top lip 207-4), but similar notches may also be present perhaps in the lower shelf and bottom flange. In some embodiments, the angle of the notch may be about 180° minus the angle of the panel corner being enclosed. Similarly, the ends of the frame precursor structure may also include an angled cut (210N and 220N) in the top lip, the lower shelf, and the bottom flange to accommodate formation of a corner joint.

Figure 2D:
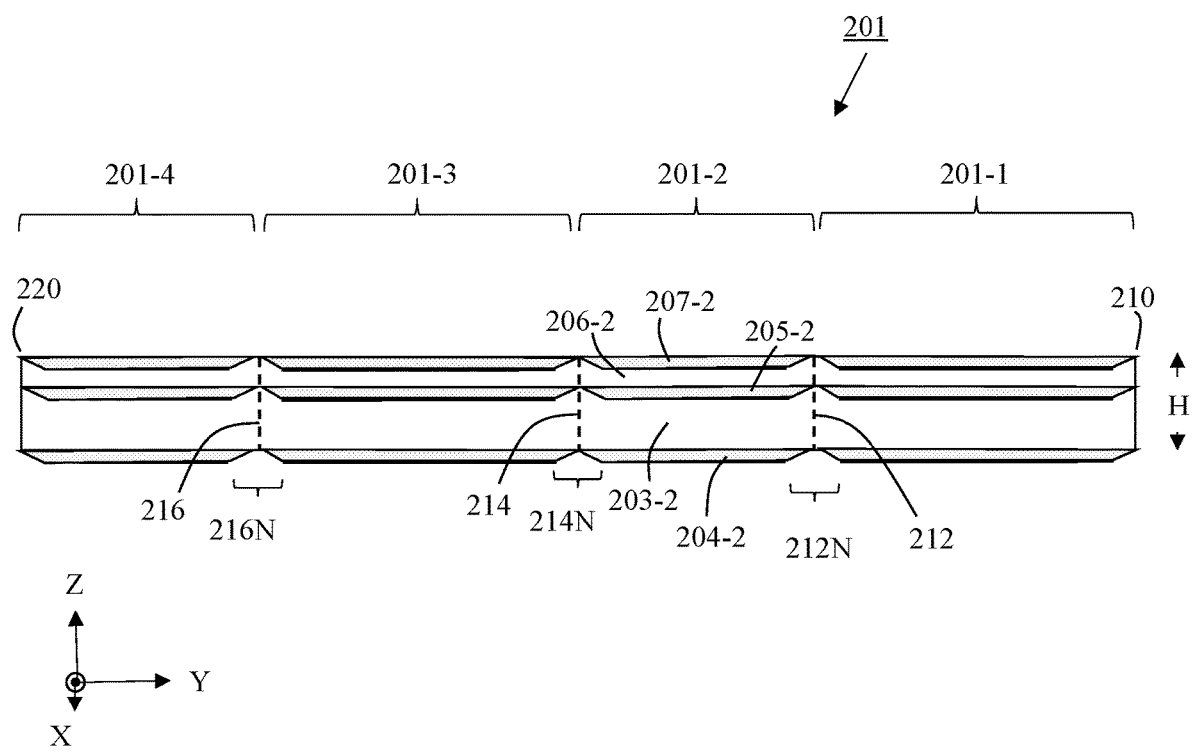
FIG. 2D is a side view with slight elevation of a non-limiting example of a frame precursor structure according to some embodiments.

In FIG. 2D, there is shown a non-limiting example of a side view schematic (with slight elevation) of the frame precursor structure facing the side that can receive the panel. For clarity, not all of the features are labelled, but in combination with the other figures the identity of each feature is self-evident.

Figure 2E:
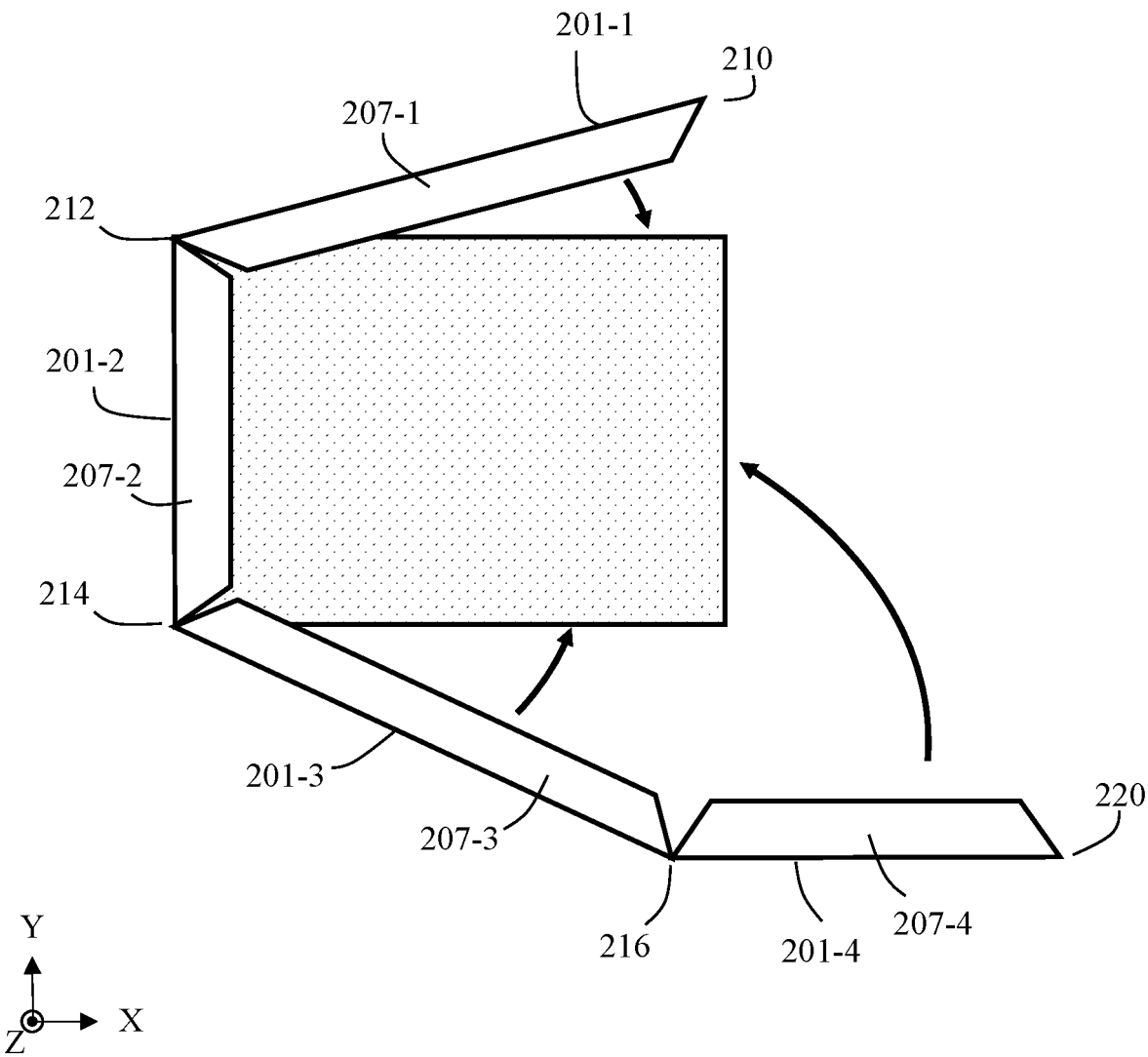
FIG. 2E is a plan view of a non-limiting example of a frame precursor structure and a panel at an intermediate stage of assembly according to some embodiments.

Referring to FIG. 2E, there is a plan view showing a non-limiting example of an intermediate state of assembling the framed panel structure where the frame precursor structure has received the panel edge 190-2 into frame section 201-2 and bends are being formed along the bend precursor axes as other frame sections move closer to their intended final positions around the panel. Note that assembly does not have to start with panel edge 190-2 but may instead start with any panel edge or corner. Forming the corner joint 118 (see FIG. 1A) where the two ends (210 and 220) of the frame precursor structure meet may be a final step in this portion of the framed panel structure assembly, but there may be additional steps to further secure or modify the frame (e.g., adding optional support brackets, tightening optional bolts, or the like). In some embodiments, assembling the framed panel structure may include use of an assembly apparatus that holds and manipulates the panel and frame precursor structure(s). With respect to orientation of the components during assembly relative to the assembly apparatus, the plan view of FIG. 2E may represent a view from above, or alternatively a view from below, or even a view from the side, depending on the nature of the assembly apparatus.

Although not illustrated in FIGS. 2A-2E, one or more frame sections may further include a support wall extending from the bottom flange to the panel containment structure or to the frame sidewall, as described in more detail elsewhere herein.

In some embodiments, the frame precursor structure 201 may be substantially linear (as shown) prior to assembling the framed panel structure. In some embodiments, the frame precursor structure may be received by an assembler already partially bent at one or more corner bend precursor axes. One or more corner bend precursor axes may be pre-scored or include a furrow or features that promote bending along the height access between the frame sections.

The framework material should have sufficient strength to support the panel. In some embodiments, the framework material may include a metal such as uncoated steel, coated steel, stainless steel, aluminum, or another metal or metal alloy (coated or uncoated), or the like. In some embodiments, the framework material may be a coated metal such as coated steel or the like that includes an anti-corrosion coating or treatment. For example, coated steel may include metallic-coated steel, organic-coated steel, or tinplate. Some non-limiting examples of metallic coatings for steel may include zinc and zinc alloys (e.g., a Zn—Al alloy), aluminum, and magnesium. Depending on the coating, such metallic coatings may be applied by hot dip galvanization, electro-galvanizing, thermal spray, or the like. Some non-limiting examples of organic coatings may include polyesters or PVDF, which may be applied from a paint or other coatable mixture. Tinplate may be made by coating tin onto the cold-rolled steel, e.g., by electroplating. In some embodiments, the thickness of coated steel for use as a framework material may be in a range of about 0.5 to about 0.6 mm, alternatively about 0.6 to about 0.7 mm, alternatively about 0.7 to about 0.8 mm, alternatively about 0.8 to about 0.9 mm, alternatively about 0.9 to about 1.0 mm, alternatively about 1.0 to about 1.2 mm, alternatively about 1.2 to about 1.4 mm, alternatively about 1.4 to about 1.6 mm, alternatively about 1.6 to about 1.8 mm, alternatively about 1.8 to about 2.0 mm, or any combination or permutation of ranges thereof. When a coated steel framework material may be used to make a frame for a conventional photovoltaic solar panel, in some embodiments, the thickness may be in a range of about 0.7 to about 1.4 mm.

In some embodiments, steel may be a steel other than stainless steel. For some applications, e.g., for photovoltaic solar panels, steel may have a useful combination of technical and commercial benefits. Steel can have properties that may be applied in the material selection, fabrication, and long-term durability that are useful to the form and function of the frame or frame precursor structure product. During preproduction, steel may be readily coated with anti-corrosion coatings employing multiple chemistries that offer corrosion resistance which can be beneficial to the durability of the frames. Steel may be painted with clear or specific colors that may optionally allow identification of a specific module selection of various categories. Because painting or anti-corrosion coatings may be applied in high-speed manufacturing formats, the cost and durability are more effective than most other metals. Steel may optionally be both painted and have anti-corrosion coatings, allowing for multiple benefits to the branding, module identification, and long-term maintenance over non-steel module frames.

Steel is a highly durable material that may be significantly deformed while retaining its toughness and resistance to structural failure. The properties of toughness while being deformed may be referred to as ductility. Due to the ductility of steel, it may be shaped starting from a thin sheet of material, e.g., wrapped around a coil, which may be fed directly into a punching station that may employ a variety of methods to cut or partially cut or create grooves in the face of the steel sheet. Following this process, the steel which has been modified in the punching station may be fed into a linear and non-linear set of rollers which can deform the steel sheet into a new profile, of which many variations are possible. Due to the ductility of steel, this process may be performed at high speed, with production speeds from less than about 0.1 meters/second to over about 4.0 meters/second. Steel's compatibility with this high-speed forming process may provide significant manufacturing cost advantages. Due to steel's ductility, it may be bent into simple or complex shapes that can retain their relative shape or position for the life of the product. In some embodiments, steel that has been shaped into simple or complex forms may also be designed to yield or partially yield at specific locations or along a predetermined path as part of intended installation or operational parameters.

Steel has electrical properties which may allow it to act as a code-approved path of intended electricity, such as to create an electrical ground or electrical bonding. Due to the properties of steel and the potential anti-corrosion or paint coatings available, the electrical ground or electrical bonding may still occur without the need for additional hardware or devices. When steel module frames can be attached directly to a steel structure, most electrical codes allow for this connection to be considered a competent electrical ground or electrical bond. This means that the framed panel structures may connect directly to a steel substructure and may be considered to have achieved sufficient electrical ground or electrical bond sufficient to meet code, with or without addition of hardware, as part of the module-to-substructure attachment.

Steel's magnetic properties may allow for special features and benefits through the use of magnetic steel frames. The magnetic properties of steel may allow for simple attachments of appurtenances utilizing few or no added hardware. Steel's magnetic properties may allow for sensory devices to collect useful data during the manufacture of a frame precursor structure or data regarding a panel installation. Steel's magnetic properties may allow for robot sensors to be used to assist in the proper installation or deinstallation of panel modules. Steel's magnetic properties may allow the easy attachment or pre-attachment of hardware of various sorts to the module frame to facilitate installation of additional equipment.

The frame and frame precursor structures described in FIGS. 1A-C and 2A-E are non-limiting examples provided in order to illustrate how some of the interlocking features described herein may be implemented in a frame. As discussed elsewhere herein, in some embodiments, rather than using one frame precursor structure, multiple frame precursor structures may be used to enclose a panel. Numerous alternative frame designs and structures, including but not limited to those having a feature generally corresponding to a bottom flange as described herein, may be used effectively with such interlocking features. As described herein, some embodiments of interlocking features may restrict multidirectional movement of two adjacent bottom flange features. In some embodiments, an interlocking feature may restrict movement of adjacent bottom flanges along multiple axes within at least the X-Y plane.

Figure 3A:
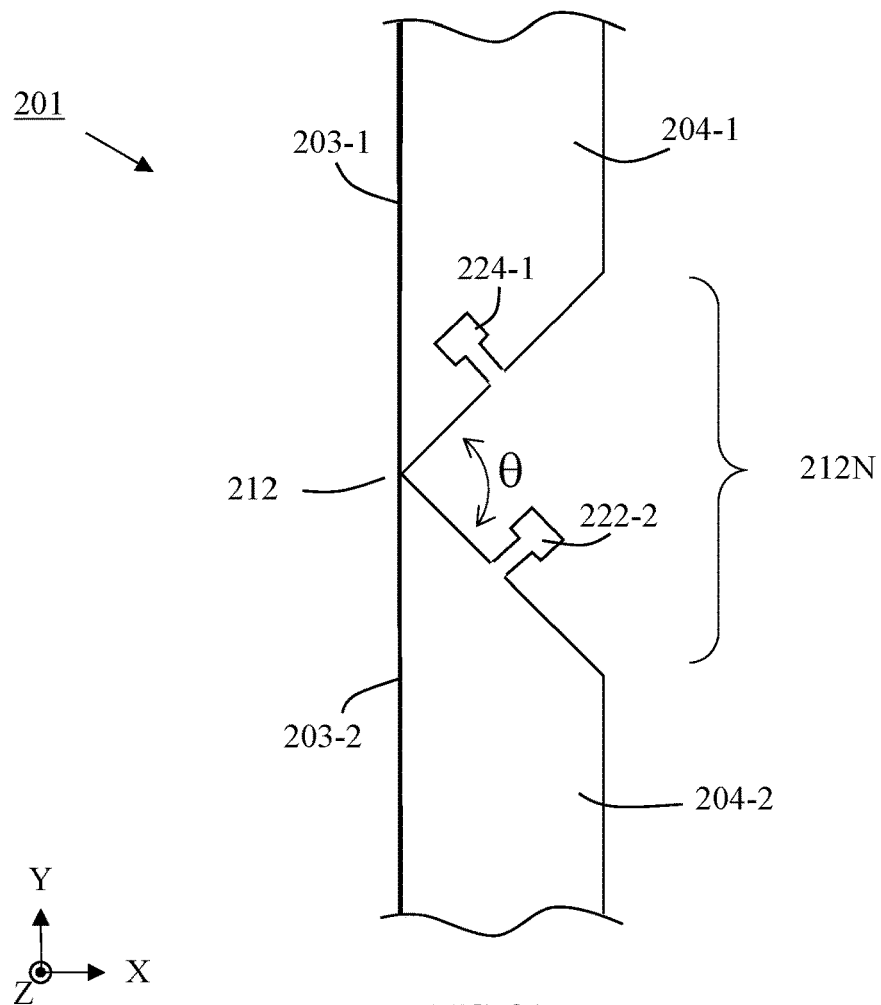
FIG. 3A is a plan view of a portion of a non-limiting example of a frame precursor structure at a corner bend precursor axis illustrating a notch, an opening, and a locking element according to some embodiments.
Figure 3B:
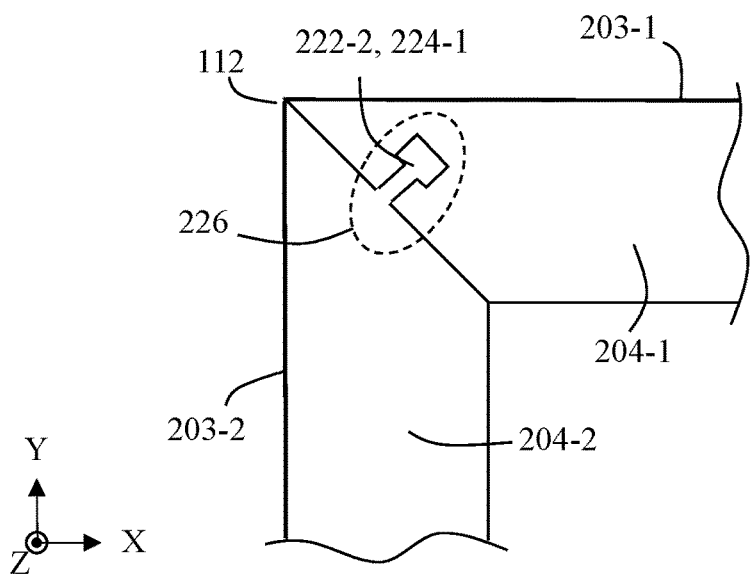
FIG. 3B is a plan view of a portion of a non-limiting example of a frame at a corner bend illustrating a corner bend interlocking feature according to some embodiments.

In some embodiments, one or more notches in the bottom flange may be a patterned notch. FIG. 3A is a plan view of a portion of a non-limiting example of a frame precursor structure 201 at the first corner bend precursor axis 212 to illustrate a patterned notch 212N in the bottom flange. For clarity, the view excludes the top lip and lower shelf. Frame sidewalls 203-1 and 203-2 in this view may correspond to the left edge of bottom flange 204-1 and 204-2, respectively. In some embodiments, the angle θ of the notch which may be a notch angle may be about 180° minus the angle of the panel corner being enclosed. In FIG. 3A, notch angle θ may be about 90°. Bottom flange 204-2 on one side of the notch may include a locking element 222-2 whereas bottom flange 204-1 on the other side of the notch may include an opening 224-1 designed to receive the locking element. As shown in FIG. 3B, when the frame precursor structure is bent at the first corner bend precursor axis to form first corner bend 112, the locking element 222-2 may be received into the opening 224-1 so that the bottom flanges locks in place. Locking element 222-2 and opening 224-1 may collectively be referred to as a corner bend interlocking feature 226. In some embodiments, the locking element may be an extension of the bottom flange 204-2 and have a shape that is similar to the opening so that it fits into the opening 224-1 substantially in plane with the first bottom flange 204-1. Note that during the bending, there may be some small twisting or other force applied perhaps to raise the plane of bottom flange 204-2 relative to bottom flange 204-1 so that the locking element can initially slide over the top of bottom flange 204-1. When the locking element and opening are sufficiently aligned, the twisting or other force may be released perhaps to allow the planes of bottom flanges 204-2 and 204-1 to realign thereby activating the interlocking feature. Alternatively, the twisting or other force may be opposite so that the locking element initially slides underneath the bottom flange. In some embodiments, the locking element 222-2 may be bent out of plane of the bottom flanges during bending and then press fitted into opening 224-1. In some embodiments, locking element 222-2 may have a dynamic spring or expansion feature so that it may be easily received into the opening perhaps without the twisting or other forces mentioned herein and then expands or springs into place.

The interlocking feature may have several benefits. For example, it may simplify the assembly of the frame by having corner bends (or corner joints) that can easily lock into place during assembly with reduced need of special tools or additional parts. As mentioned, after initial assembly, additional parts or even bracing may be added to the frame, but that is also simplified by having the initial frame assembly already locked in place. In addition, during use, the interlocking feature may provide additional structural support perhaps to resist frame deformations caused, for example, by heavy snow, winds, or other forces pushing on the panel which may translate into lateral force on the bottom flange to cause separation at the corners.

Figure 3C:
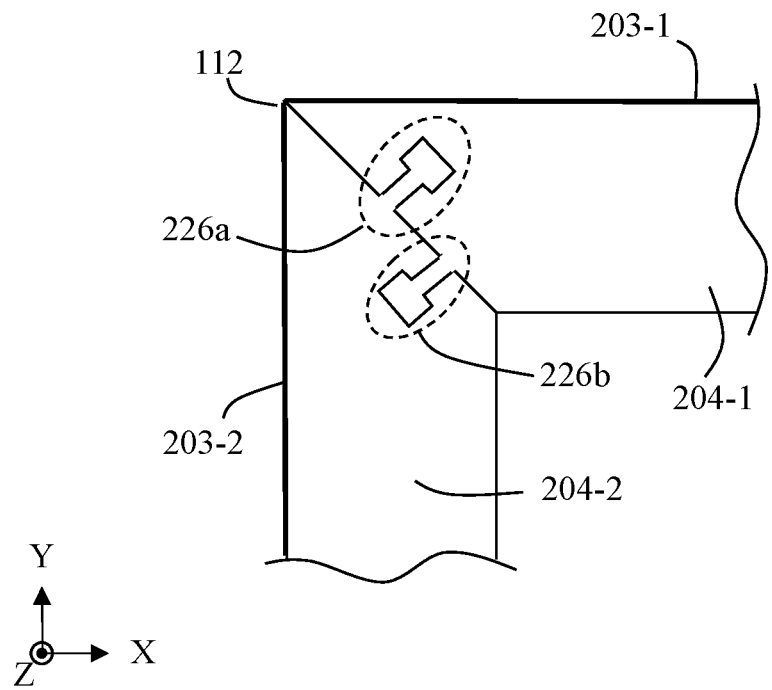
FIG. 3C is a plan view of a portion of a non-limiting example of a frame at a corner bend illustrating multiple corner bend interlocking features according to some embodiments.

Although only a single corner bend interlocking feature is shown in FIGS. 3A and 3B, there may be multiple interlocking features, e.g., as shown in FIG. 3C, which may be similar FIG. 3B, but including two interlocking features, 226a and 226b, or the like.

Figure 3D:
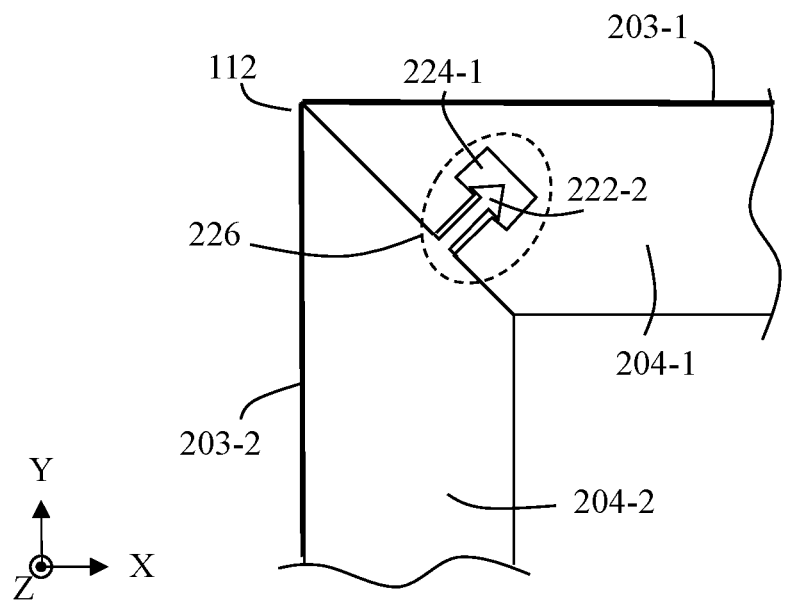
FIG. 3D is a plan view of a portion of a non-limiting example of a frame at a corner bend illustrating a corner bend interlocking feature according to some embodiments.

FIGS. 3A-3C illustrates some embodiments where the shape of the locking element may substantially match the shape of the opening perhaps so that locking element fills the opening much like a puzzle piece. In some embodiments, a substantially matching locking element may occupy at least about 50% of the area of the opening, alternatively, at least about 60%, about 70%, about 80%, or even at least about 90%. In other embodiments, the shape of the locking element may be significantly different than the opening, but still may operate as an interlocking feature perhaps so long as critical geometries are maintained. For example, FIG. 3D illustrates an interlocking feature 226 where the locking element 222-2 has a different shape than opening 224-1, but still locks in place. In some embodiments, a non-matching locking element may occupy an area of the opening that is less than about 50%, alternatively less than about 40%, about 30%, about 20%, or even less than about 10%.

Figure 4A:
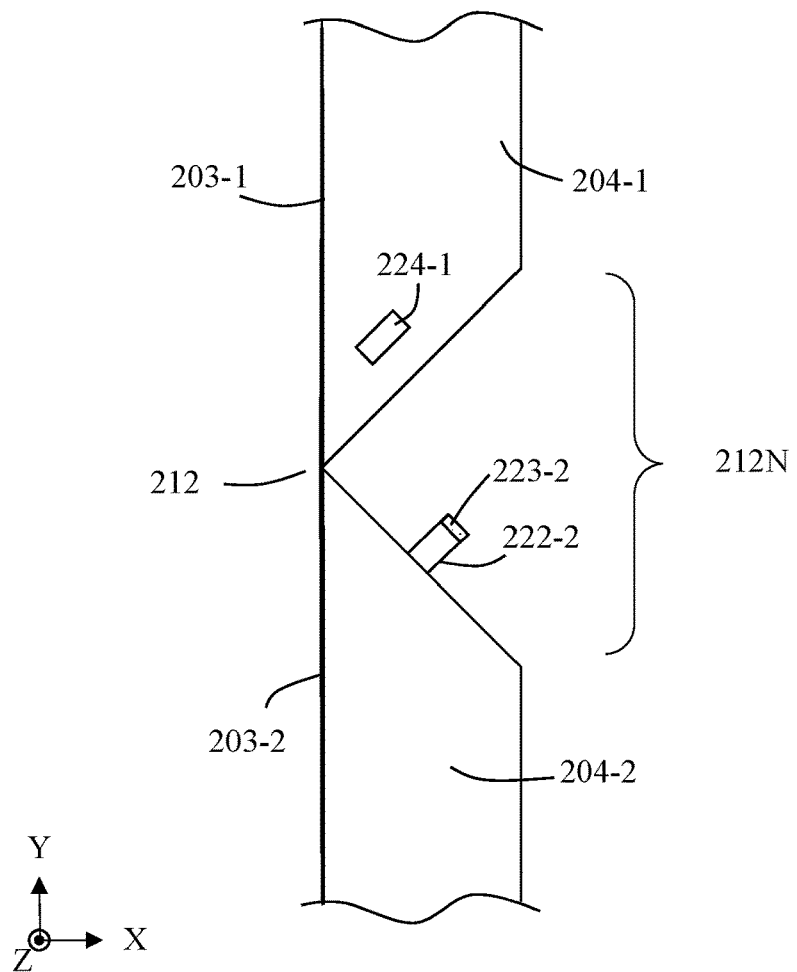
FIG. 4A is a plan view of a portion of a non-limiting example of a frame precursor structure at a corner bend precursor axis illustrating a notch, an opening, and a locking element having a hook feature according to some embodiments.
Figure 4B:
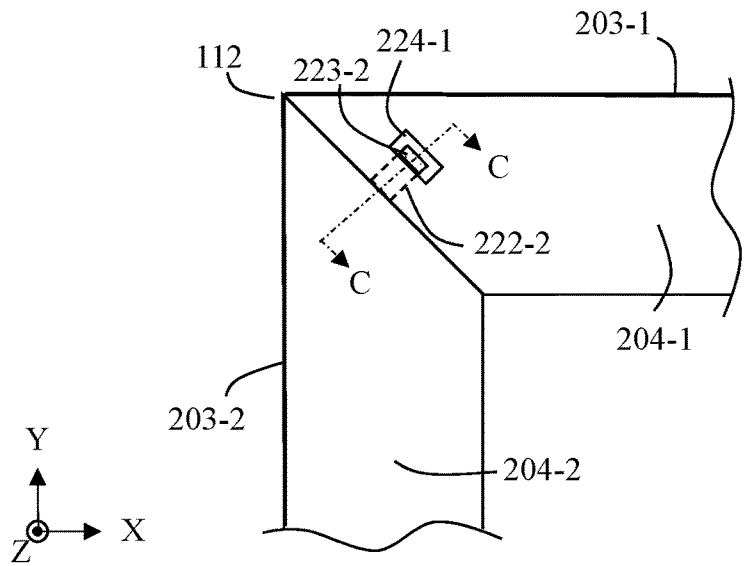
FIG. 4B is a plan view of a portion of a non-limiting example of a frame at a corner bend illustrating a corner bend interlocking feature according to some embodiments.
Figure 4C:
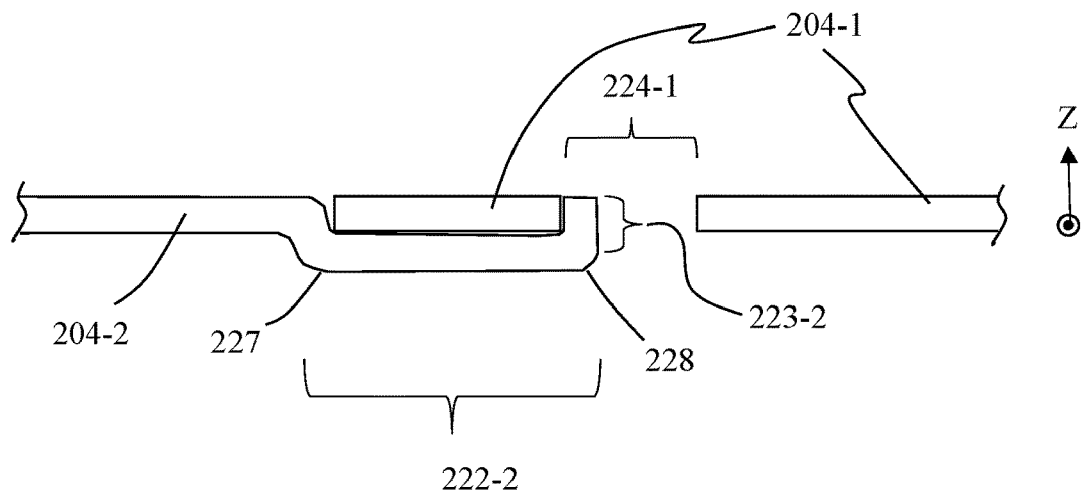
FIG. 4C is a cross-sectional view of FIG. 4B along cutline C-C illustrating a non-limiting example of the corner bend interlocking feature according to some embodiments.

In some embodiments, the interlocking feature may include a locking element that acts as a hook which is received by the opening. For example, FIG. 4A is a plan view of a portion of a non-limiting example of a frame precursor structure similar to FIG. 3A, except that the opening 224-1 in flange 204-1 may be an enclosed hole and locking element 222-2 may include a hook feature 223-2. As shown in FIG. 4B, when the frame precursor structure may be bent at the first corner bend precursor axis to form first frame corner 112, the hook feature 223-2 of locking element 222-2 is received into the opening 224-1 and catches the edge of opening 224-1 to form an interlocking feature that locks the bottom flanges in place. To further illustrate, FIG. 4C shows a cross-sectional view of FIG. 4B along cutline C-C. In some embodiments as shown in FIG. 4C, the locking element 222-2 may slip under bottom flange 204-1 and the hook feature 223-2 may extends up through at least a portion of opening 224-1. As mentioned previously, a slight force may be applied to ensure that the locking element is guided below bottom flange 204-1 during the corner bend process. Alternatively, the locking element may be designed to go over the top of bottom flange 204-1 and the hook feature extends downward through the opening. In some embodiments, the locking element 222-1 with hook feature 223-2 may be bent out of plane with the flange and then press fitted into the opening 224-1. In FIG. 4C, the end of hook feature 223-2 may be approximately flush with the top surface of bottom flange 204-1. In other embodiments, the hook feature 223-3 may extend higher than the top surface, or alternatively not reach the top surface of the bottom flange. In some embodiments, the hook feature 223-2 may be formed by a hook bend 228 near the end of locking element 222-2. Hook bend 228 may form an angle sufficient to hold the frame corner in place. The locking element 222-2 may optionally include an extension bend 227 perhaps to alter the plane of the locking element relative to bottom flange 204-1 to ease assembly and/or make the locking element flush with the bottom flange 204-1. However, extension bend 227 may not be necessary so long as the bottom flanges have some flexibility or the hook feature is long enough. Alternatively, the second frame section may have a lengthwise fold so that plane of bottom flange 204-2 is already offset relative to bottom flange 204-1. Alternatively, rather than an extension bend 227, the plane of bottom flange 204-1 may be altered by a bend of its own.

Figure 4D:
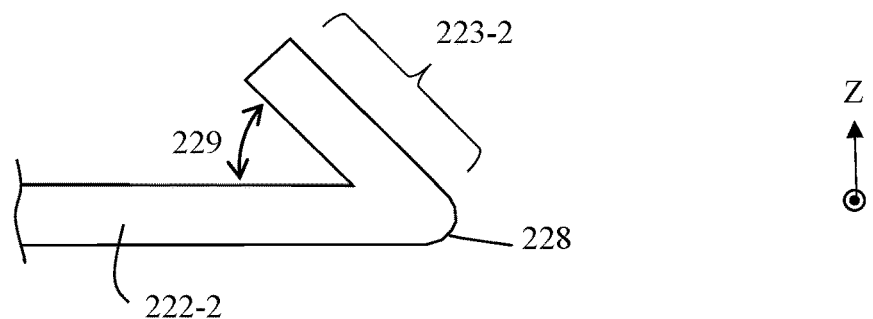
FIG. 4D is a cross-sectional view of a non-limiting example of a locking element including a hook feature according to some embodiments.
Figure 4E:
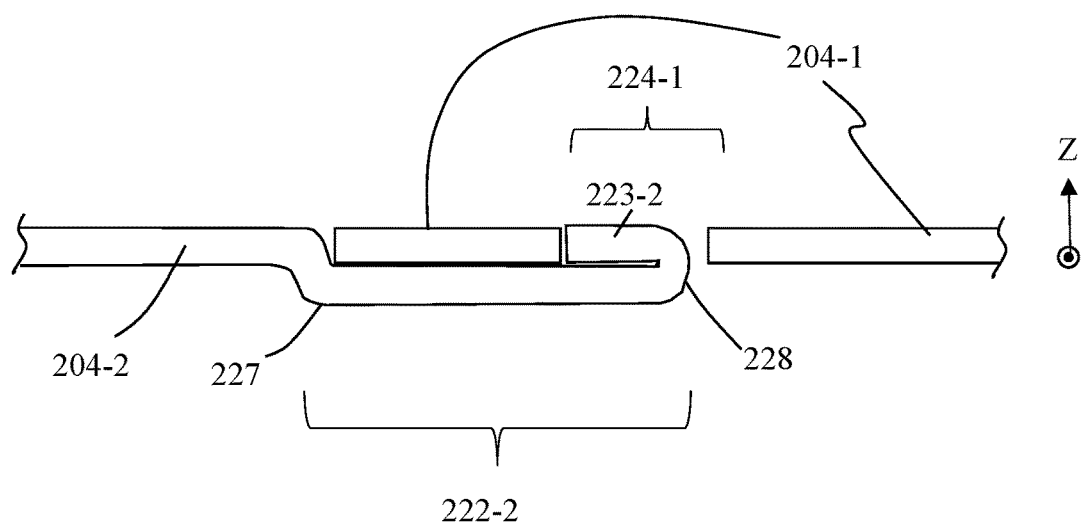
FIG. 4E is a cross-sectional view of a non-limiting example of a locking element including a hook feature according to some embodiments.

As shown in FIG. 4C, the hook bend angle may be about 90° relative to the plane of the locking element, but other hook bend angles may be effective. Referring to FIG. 4D, there is shown just a portion of locking element 222-2 having hook bend 228 that can form hook feature 223-2 at a hook bend angle 229. In some embodiments (as in FIG. 4D), the hook bend angle may be acute (less than 90°) such that the hook feature may bend backwards partially over locking element. Alternatively (not shown), the hook bend angle may be obtuse and still be effective. In some embodiments the hook bend angle may be in a range of about 15° to about 30°, alternatively about 30° to about 45°, alternatively about 45° to about 60°, alternatively about 60° to about 75°, alternatively about 75° to about 85°, alternatively about 85° to about 95°, alternatively about 95° to about 105°, alternatively about 105° to about 120°, or any combination of ranges thereof. In some embodiments, e.g., as shown in FIG. 4E, the hook feature 223-2 may be bent backwards almost entirely, e.g., where the hook bend angle may be in a range of about 0° to about 15°.

Although the embodiments of FIGS. 4A-E show one interlocking feature, a corner bend (or even a corner joint) may have multiple interlocking features. In some embodiments, rather than bending the locking element to form the hook feature (e.g., using the framework material of the frame precursor), a hook feature may be attached to the end of the locking element as a separate piece, e.g., welded, brazed, soldered, glued, or the like.

Figure 5A:
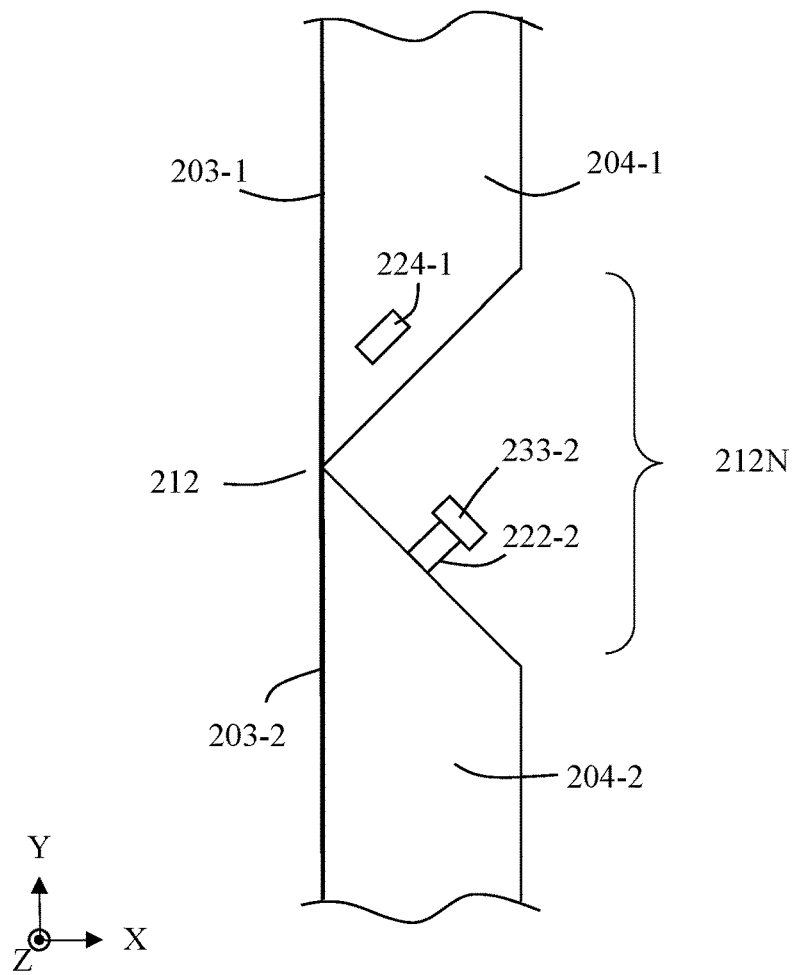
FIG. 5A is a plan view of a portion of a non-limiting example of a frame precursor structure at a corner bend precursor axis illustrating a notch, an opening, and a locking element having a plug feature according to some embodiments.
Figure 5B:
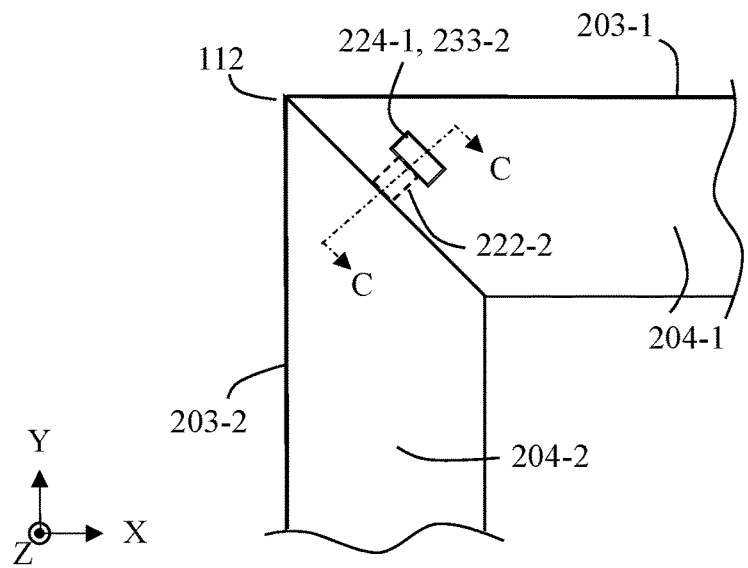
FIG. 5B is a plan view of a portion of a non-limiting example of a frame at a corner bend illustrating a corner bend interlocking feature according to some embodiments.
Figure 5C:
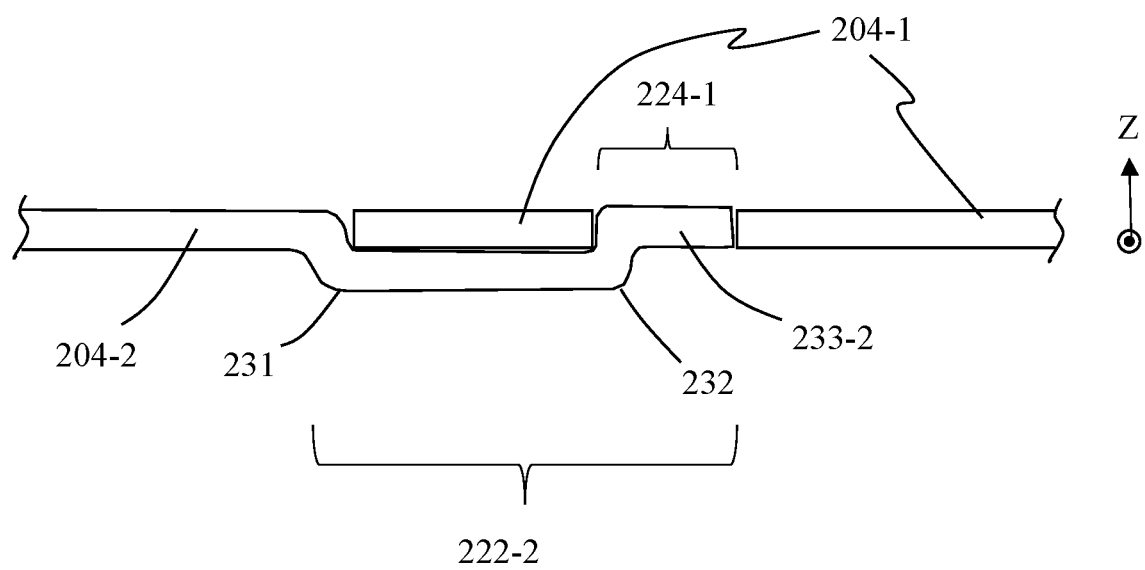
FIG. 5C is a cross-sectional view of FIG. 5B along cutline C-C illustrating a non-limiting example of the corner bend interlocking feature according to some embodiments.

In some embodiments, the locking element may include a plug feature that fits into the opening. For example, FIG. 5A is a plan view of a portion of a non-limiting example of a frame precursor structure similar to FIG. 4A except that locking element 222-2 may include a plug feature 233-2. As shown in FIG. 5B, when the frame precursor structure may be bent at the first corner bend precursor axis to form first frame corner 112, the plug feature 233-2 of locking element 222-2 may be received into the opening 224-1 to form an interlocking structure that locks the bottom flanges in place. To further illustrate, FIG. 5C shows a cross-sectional view of FIG. 5B along cutline C-C. In some embodiments, the locking element may include a plug bend 232 perhaps to match the plane of plug feature 233-2 with bottom flange 204-1 and opening 224-1. The locking element may optionally include extension bend 231 to alter the plane of the locking element relative to bottom flange 204-1 perhaps to ease assembly and make the locking element flush with the bottom flange 204-1. Many of the properties, options, and variations described for forming interlocking features described with respect to embodiments of FIGS. 4A-E may also be applied to the embodiments of FIGS. 5A-C. For example, the locking element may be designed to go over the top of bottom flange 204-1 and the plug feature may extend downward through the opening. Multiple interlocking features may be used.

Figure 6A:
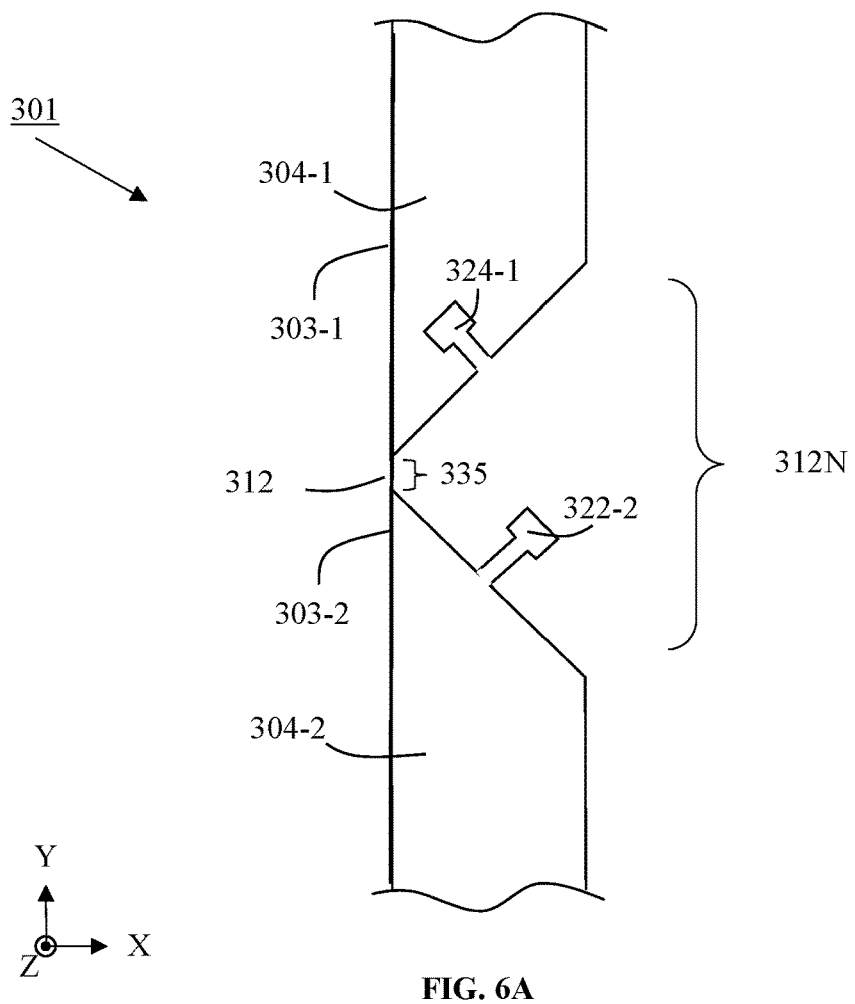
FIG. 6A is a plan view of a portion of a non-limiting example of a frame precursor structure at a corner bend precursor axis illustrating a notch, an opening, and a locking element according to some embodiments.
Figure 6B:
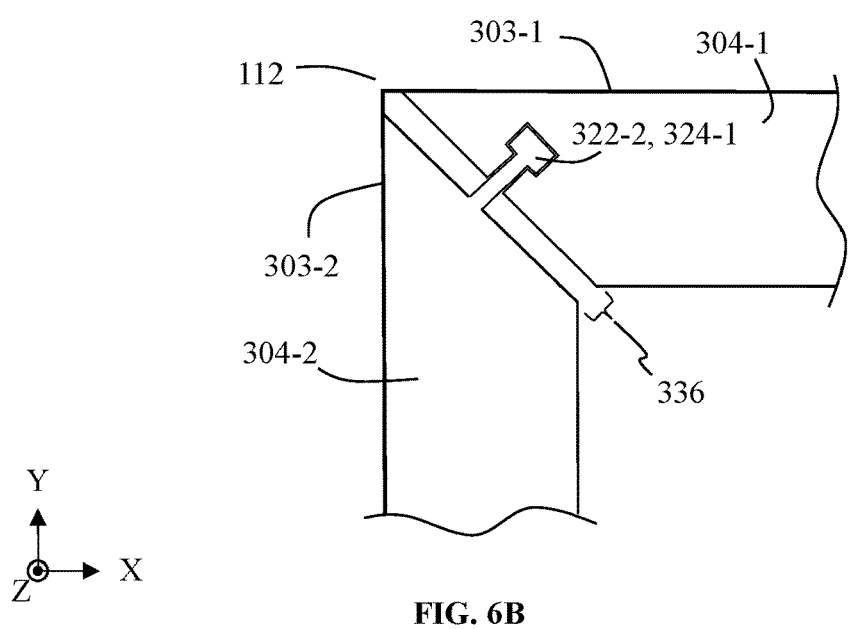
FIG. 6B is a plan view of a portion of a non-limiting example of a frame at a corner bend illustrating a corner bend interlocking feature according to some embodiments.

In some embodiments, the bottom flange notch may be cut so that, upon assembling the frame, the edge of bottom flange of the first frame section is not flush with the corresponding edge of bottom flange of the second frame section. For example, FIG. 6A is a plan view of a portion of a frame precursor structure 301 according to some embodiments. The features of FIG. 6A may be analogous to those described with respect to FIGS. 2A-2E. FIG. 6A may be similar to FIG. 3A, but notch 312N has been cut so that there may be a space 335 centered at first corner bend precursor axis 312 between where bottom flange 304-1 meets frame sidewall 303-1 and where bottom flange 304-2 meets frame sidewall 303-2. Note that the frame sidewall 303 may be continuous and that frame sidewall 303-1 and 303-2 may be defined by the location of the corner bend precursor axis 312. As with FIG. 3A, various other features of the frame precursor structure (e.g., the panel containment structure, other frame sections, or the like) are omitted for clarity. As shown in FIG. 6B, when the frame precursor structure may be bent at the first corner bend precursor axis to form first frame corner 112, the locking element 322-2 may be received into the opening 324-1 to form an interlocking structure that locks the bottom flanges in place. In some embodiments, there may also be a gap 336 between the bottom flanges 304-1 and 304-2.

Although not illustrated, embodiments using a hook feature or a plug feature as shown in FIGS. 4A-E and 5A-C may be applied in a manner similar to other embodiments such as shown in FIGS. 6A-B.

Figure 7A:
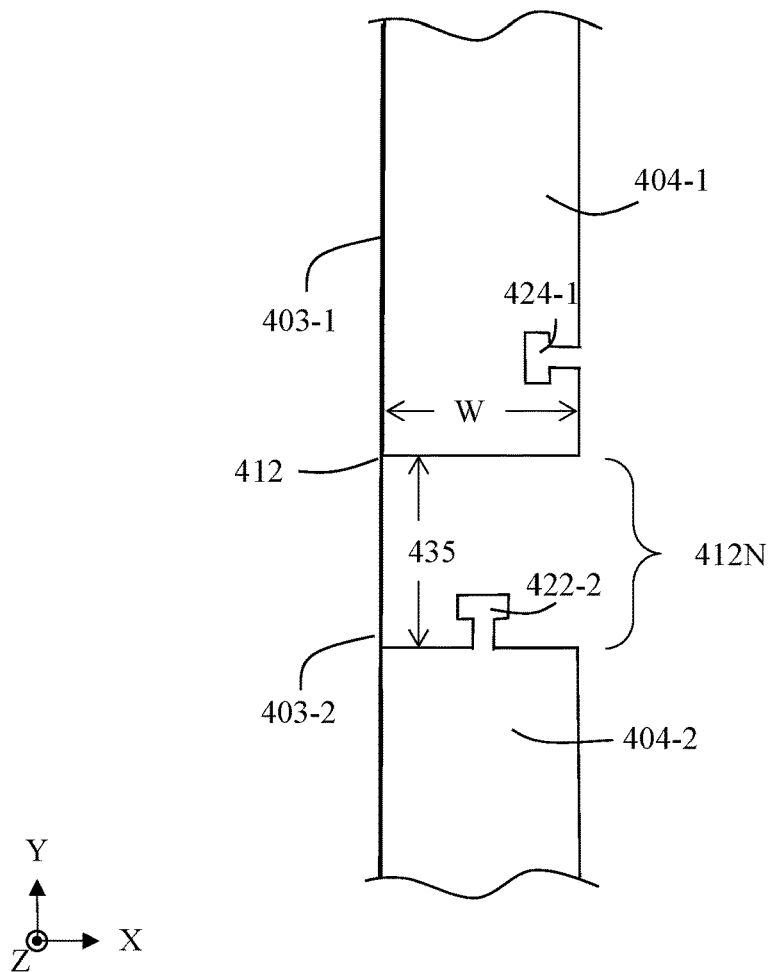
FIG. 7A is a plan view of a portion of a non-limiting example of a frame precursor structure at a corner bend precursor axis illustrating a notch, an opening, and a locking element according to some embodiments.
Figure 7B:
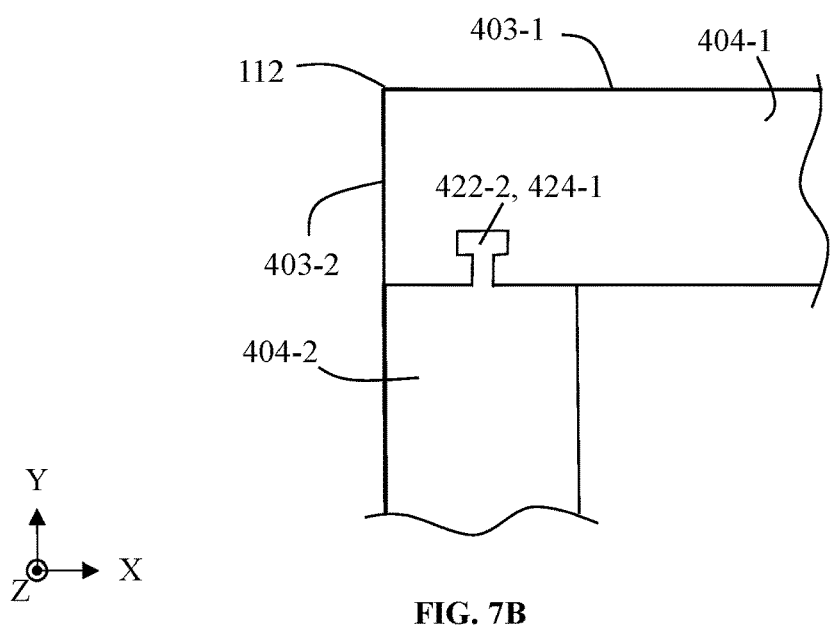
FIG. 7B is a plan view of a portion of a non-limiting example of a frame at a corner bend illustrating a corner bend interlocking feature according to some embodiments.

In some embodiments, the bottom flange notch cut may have a different shape than disclosed elsewhere herein and/or the notch may not be symmetrical about the corner bend precursor axis. For example, FIG. 7A is a plan view of a portion of a frame precursor structure according to some embodiments. The features of FIG. 7A may be analogous to those described with respect to FIGS. 2A-2E. A generally square notch 412N may be cut in bottom flange 404-2 extending from the first corner bend precursor axis 412 to a distance 435 which may be approximately equal to the width W of bottom flange 404-1. Note that the frame sidewall may be continuous and that frame sidewall 403-1 and 403-2 may be defined by the location of the first corner bend precursor axis 412. Bottom flange 404-2 may include locking element 422-2. Bottom flange 404-1 may include an opening 424-1 designed to receive the locking element. As shown in FIG. 7B, when the frame precursor structure may be bent at the first corner bend precursor axis to form first frame corner 112, the locking element 422-2 may be received into the opening 424-1 to form an interlocking feature that locks the bottom flange in place.

Although not illustrated, embodiments using a hook feature or a plug feature as shown in FIGS. 4A-E and 5A-C may be applied in a manner similar to other embodiments such as shown in FIGS. 7A and 7B.

Figure 8A:
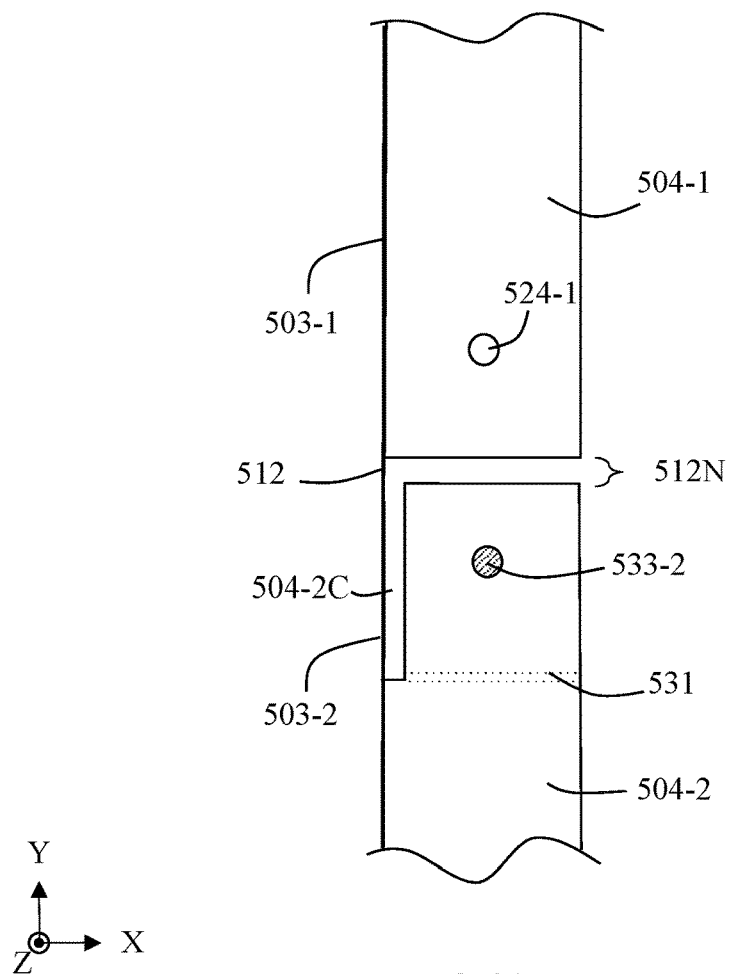
FIG. 8A is a plan view of a portion of a non-limiting example of a frame precursor structure at a corner bend precursor axis illustrating a notch, an opening, and a locking element having a plug feature according to some embodiments.
Figure 8B:
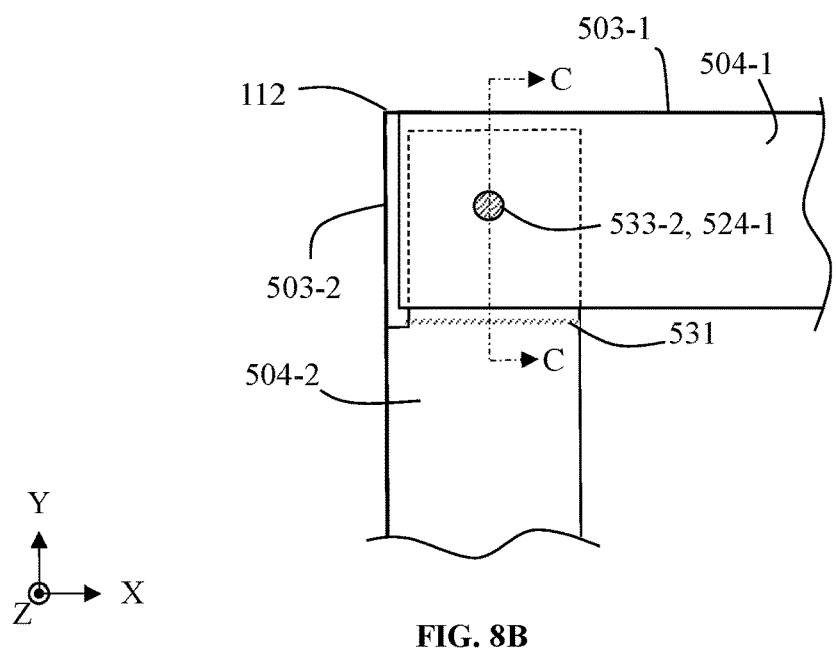
FIG. 8B is a plan view of a portion of a non-limiting example of a frame at a corner bend illustrating a corner bend interlocking feature according to some embodiments.
Figure 8C:
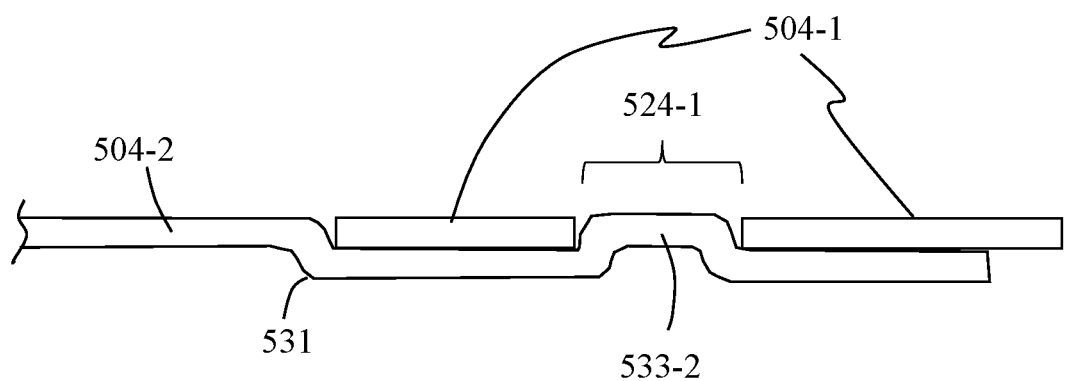
FIG. 8C is a cross-sectional view of FIG. 8B along cutline C-C illustrating a non-limiting example of the corner bend interlocking feature according to some embodiments.

In some embodiments, the locking element may include a hook feature or a plug feature (or some similar feature) and be formed in the main body of the bottom flange (or a tab thereof) perhaps rather than appearing as an extension of the bottom flange. For example, FIG. 8A is a plan view of a portion of a frame precursor structure according to some embodiments. The features of FIG. 8A may be analogous to those described with respect to FIGS. 2A-2E. For clarity, the view excluded the top lip and lower shelf of the panel containment structure. A rectangular notch 512N may be cut into the bottom flange approximately symmetrical about first corner bend precursor axis 512. Note that the frame sidewall may be continuous and that frame sidewalls 503-1 and 503-2 may be defined by the location of the first corner bend precursor axis 512. An optional narrow cut 504-2C may be made in bottom flange 504-2 extending along the sidewall from the notch 512N to at least extension bend 531 in bottom flange 504-2 that lowers the plane of this portion of bottom flange 504-2 relative to bottom flange 504-1. Bottom flange 504-2 may include a plug feature 533-2 that may act as the locking element and which can be raised relative to the plane of bottom flange 504-2. Bottom flange 504-1 may include an opening 524-1. Referring to FIG. 8B and FIG. 8C (a cross-sectional view of FIG. 8B along cutline C-C), when the frame precursor structure may be bent at the first corner bend precursor axis 512 to form first frame corner 112, bottom flange 504-2 may slide underneath bottom flange 504-1 until the plug feature 533-2 is received into opening 524-1 to form an interlocking feature whereby the bottom flanges lock in place. In some embodiments, rather than a plug element, a hook element may instead be formed in bottom flange 504-2. Many of the properties, options, and variations described for forming interlocking features described previously may also be applied to the embodiments of FIGS. 8A-C. For example, bottom flange 504-2 and its associated locking element (plug feature or hook feature) may be designed to go over the top of bottom flange 504-1 and extend downward through the opening. Multiple interlocking features may be used.

Figure 9A:
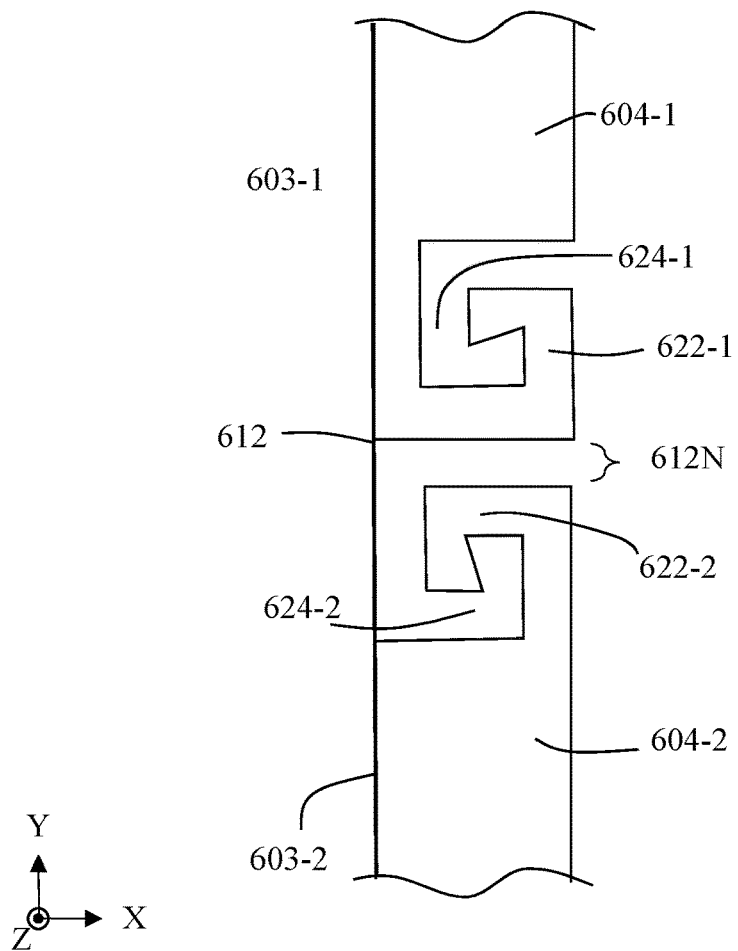
FIG. 9A is a plan view of a portion of a non-limiting example of a frame precursor structure at a corner bend precursor axis illustrating a notch, an opening, and a locking element according to some embodiments.
Figure 9B:
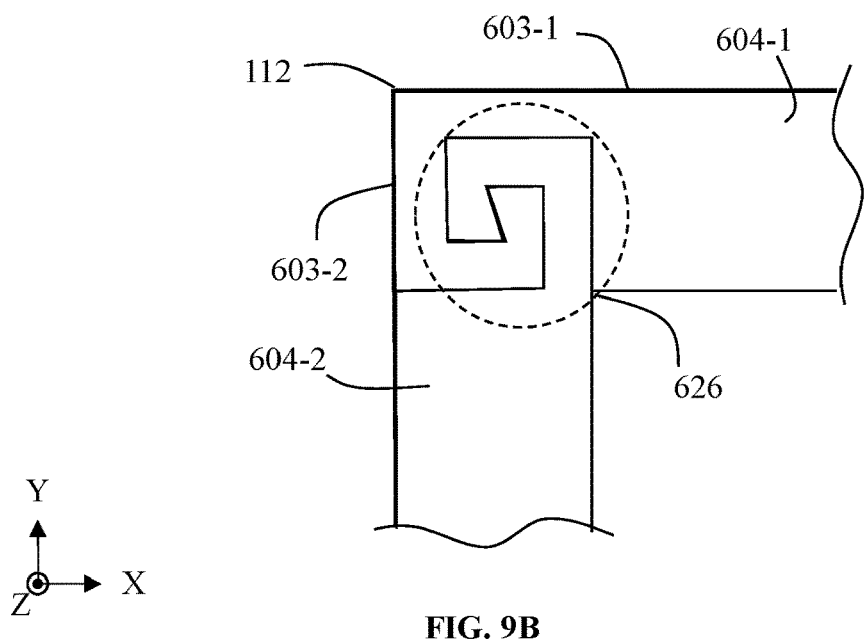
FIG. 9B is a plan view of a portion of a non-limiting example of a frame at a corner bend illustrating a corner bend interlocking feature according to some embodiments.

In FIGS. 3A-8C, the sizes of the interlocking features may be shown as relatively small, but in some embodiments, they may occupy a substantial portion of the areas of the bottom flanges in the corner bend precursor axis region (or at a corner joint). Interlocking features may be any size. FIG. 9A is a plan view of a portion of a frame precursor structure according to some embodiments. The features of FIG. 9A may be analogous to those described with respect to FIGS. 2A-2E. For clarity, the view excludes the top lip and lower shelf of the panel containment structure. The frame precursor structure may include a first corner bend precursor axis 612 and a notch 612N cut in the bottom flange. Note that the frame sidewall may be continuous and that frame sidewalls 603-1 and 603-2 may be defined by the location of the first corner bend precursor axis 612. Bottom flange 604-2 may be cut so that it includes both a locking element 622-2 and opening 624-2. Bottom flange 604-1 may be cut to include a corresponding opening 624-1 and locking element 622-1. As shown in FIG. 9B, when the frame precursor structure may be bent at the first corner bend precursor axis 612 to form first frame corner 112, locking element 622-2 may be received by opening 624-1 and locking element 622-1 may be received by opening 624-2 to form interlocking feature 626.

Referring again to FIGS. 2A-E, the bottom flanges corresponding to the second and third corner bend precursor axes may include any of the interlocking features described herein. The various corners may utilize the same or different interlocking features.

Figure 10A:
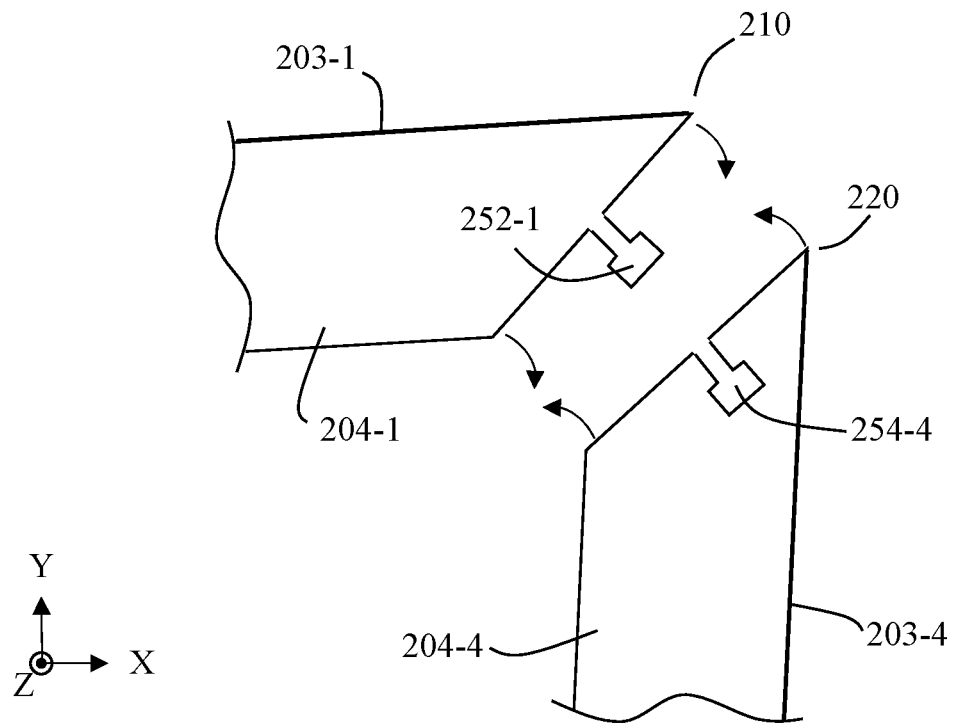
FIG. 10A is a plan view of a portion of a non-limiting example of a frame precursor structure at a corner joint illustrating an opening, and a locking element according to some embodiments.
Figure 10B:
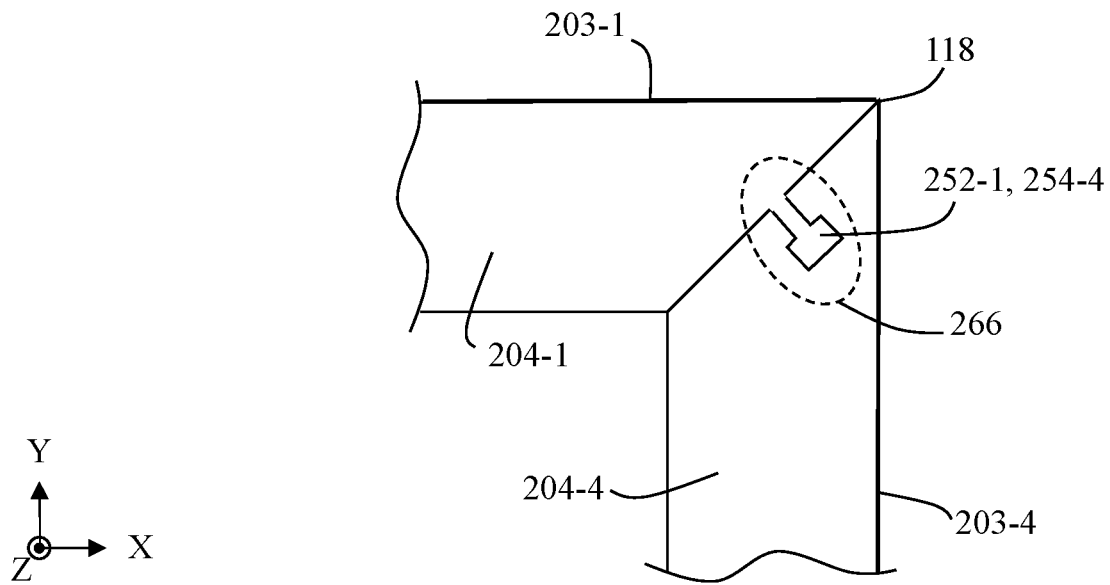
FIG. 10B is a plan view of a portion of a non-limiting example of a frame at a corner joint illustrating a corner joint interlocking feature according to some embodiments.

Although the interlocking features have been described with respect to the corner bend regions, similar interlocking features may be used anywhere on a frame including at a corner joint of the frame. To illustrate briefly, FIG. 10A is a plan view of a portion of a frame precursor structure (e.g., as in FIG. 2E) nearly assembled into the frame in accordance with some embodiments, and FIG. 10B shows the same portion after initial frame assembly. For clarity, the view excludes the panel as well as the top lip and lower shelf of the panel containment structure. A first end 210 of the frame precursor structure 201 (e.g., part of frame section 201-1) may meet with the second end 220 of the frame precursor structure (e.g., part of the fourth frame section 201-4) to form corner joint 118. Bottom flange 204-1 of the first frame section may extend from sidewall 203-1 and includes locking element 252-1 at the first end 210. Bottom flange 204-4 of the fourth frame section may extend from sidewall 203-4 and may include an opening 254-4 at the second end 220. When the bends may be completed or mostly completed in the first, second, and even third corner regions, the opening 254-4 may receive locking element 252-1 to form corner joint interlocking feature 266. Note that any of the embodiments described herein with respect to corner bend interlocking features may be used to form corner joint interlocking features.

In some embodiments, rather than using one frame precursor structure, multiple frame precursor structures may be used to enclose a panel. For example, with a rectangular panel, two similar frame precursor structures, each having one corner bend precursor axis may be used to form a framed panel structure that may include two corner joints at opposite corners and two corner bends at opposite corners. Alternatively, a first frame precursor structure may have two corner bend precursor axes and a second frame precursor structure may have no corner bend precursor axes and be used to form a framed panel structure that may include two corner joints at adjacent corners and two corner bends also at adjacent corners. Alternatively, three frame precursor structures may be used where one may have one corner bend precursor axis and the other two may not, whereby a framed panel structure may include one corner bend and three corner joints. Alternatively, four frame precursor structures may be used wherein none have a corner bend precursor axis and the framed panel structure may include four corner joints.

Figure 11:
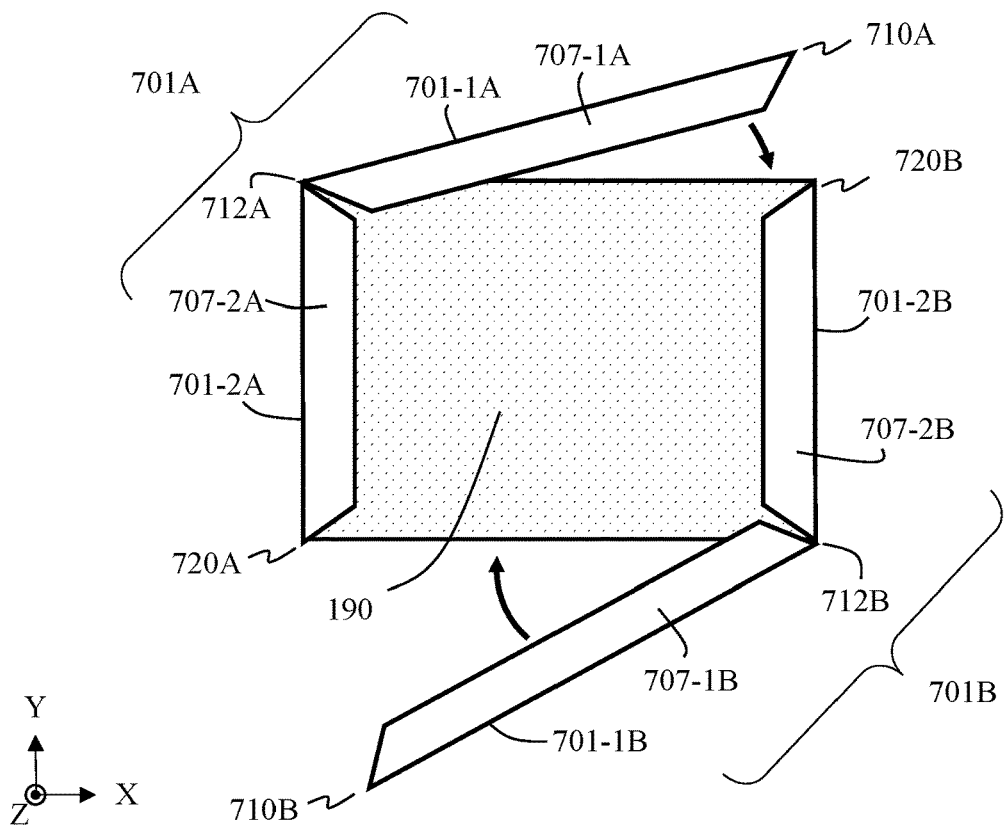
FIG. 11 is a plan view of a non-limiting example of two frame precursor structures and a panel at an intermediate stage of assembly according to some embodiments.

For example, FIG. 11 is a plan view showing an intermediate stage of assembly where two frame precursor structures, 701A and 701B, may be used to form the framed panel structure with panel 190 in accordance with some embodiments. Frame precursor structures 701A and 701B may be generally analogous to frame precursor structure 201, including their cross sections, but here each has just one corner bend precursor axis (712A, 712B). The frame precursor structures may optionally include any of the frame section features described elsewhere herein, such as a bottom flange, a side wall, and even a panel containment structure that may include a lower shelf, a pocket wall and a top lip. In some cases, one or more frame sections may further include a support wall extending from the bottom flange to the panel containment structure or to the frame sidewall as discussed elsewhere herein. In this view, the bottom flanges are not visible, but the corner bends and corner joints may utilize any of the interlocking features described herein. Frame precursor structures 701A and 701B may include frame sections 701-1A, 701-2A, 701-1B, 701-2B, first ends 710A, 710B, second ends 720A, 720B, and top lips 707-1A, 707-2A, 707-1B, 707-2B. Upon assembly, the framed panel structure of some embodiments may include two corner bends corresponding to corner bend precursor axes 712A and 712B and two corner joints corresponding to where first end 710A meets second end 720B and where first end 710B meets second end 720A. As discussed with respect to FIG. 2E, the plan view of FIG. 11 may represent a view from above, or alternatively a view from below, or even a view from the side, depending on the nature of the assembly apparatus.

Figure 12:
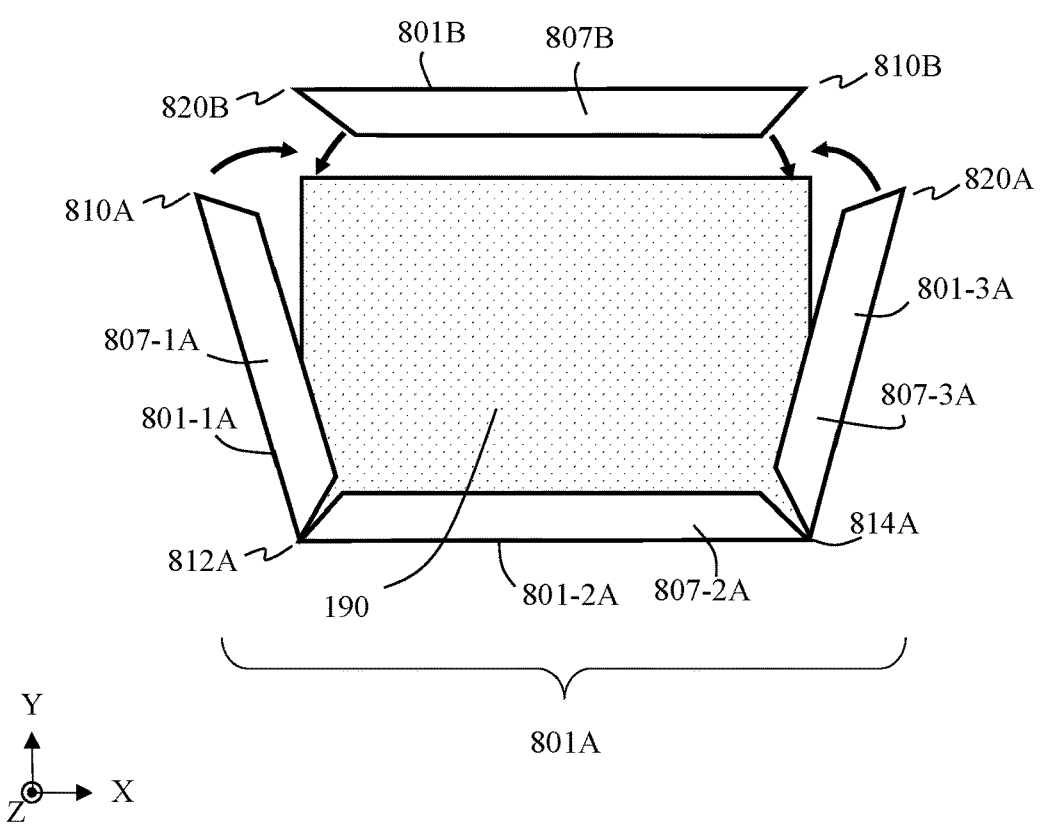
FIG. 12 is a plan view of a non-limiting example of two frame precursor structures and a panel at an intermediate stage of assembly according to some embodiments.

FIG. 12 is a plan view showing an alternative embodiment using multiple frame precursor structures to form a framed panel structure with panel 190. Frame precursor structures 801A and 801B may be generally analogous to frame precursor structure 201, including their cross sections, except that 801A may include three frame sections and two corner bend precursor axes, 812A and 814A, and 801B may be a single section having no corner bend precursor axis. The frame precursor structures may optionally include any of the frame section features described elsewhere herein, such as a bottom flange, a side wall, and even a panel containment structure that may include a lower shelf, a pocket wall and a top lip. In some cases, one or more frame sections may further include a support wall extending from the bottom flange to the panel containment structure or to the frame sidewall as discussed elsewhere herein. In this view, the bottom flanges are not visible, but the corner bends and corner joints may utilize any of the interlocking features described herein. Frame precursor structure 801A may include frame sections 801-1A, 801-2A, 801-3A, first end 80A, second end 820B, and top lips 807-1A, 807-2A, 807-3A. Frame precursor structure 801B may have a first end 810B, second end 820B, and top lip 807B. Upon assembly, the framed panel structure of some embodiments may include two corner bends corresponding to corner bend precursor axes 812A and 814A and two corner joints corresponding to where first end 810A meets second end 820B and where first end 810B meets second end 820A. In some embodiments, frame precursor 801B may correspond to one of the short edges of the panel, rather than a long edge as shown here. As discussed with respect to FIG. 2E, the plan view of FIG. 12 may represent a view from above, or alternatively a view from below, or even a view from the side, depending on the nature of the assembly apparatus.

Figure 13:
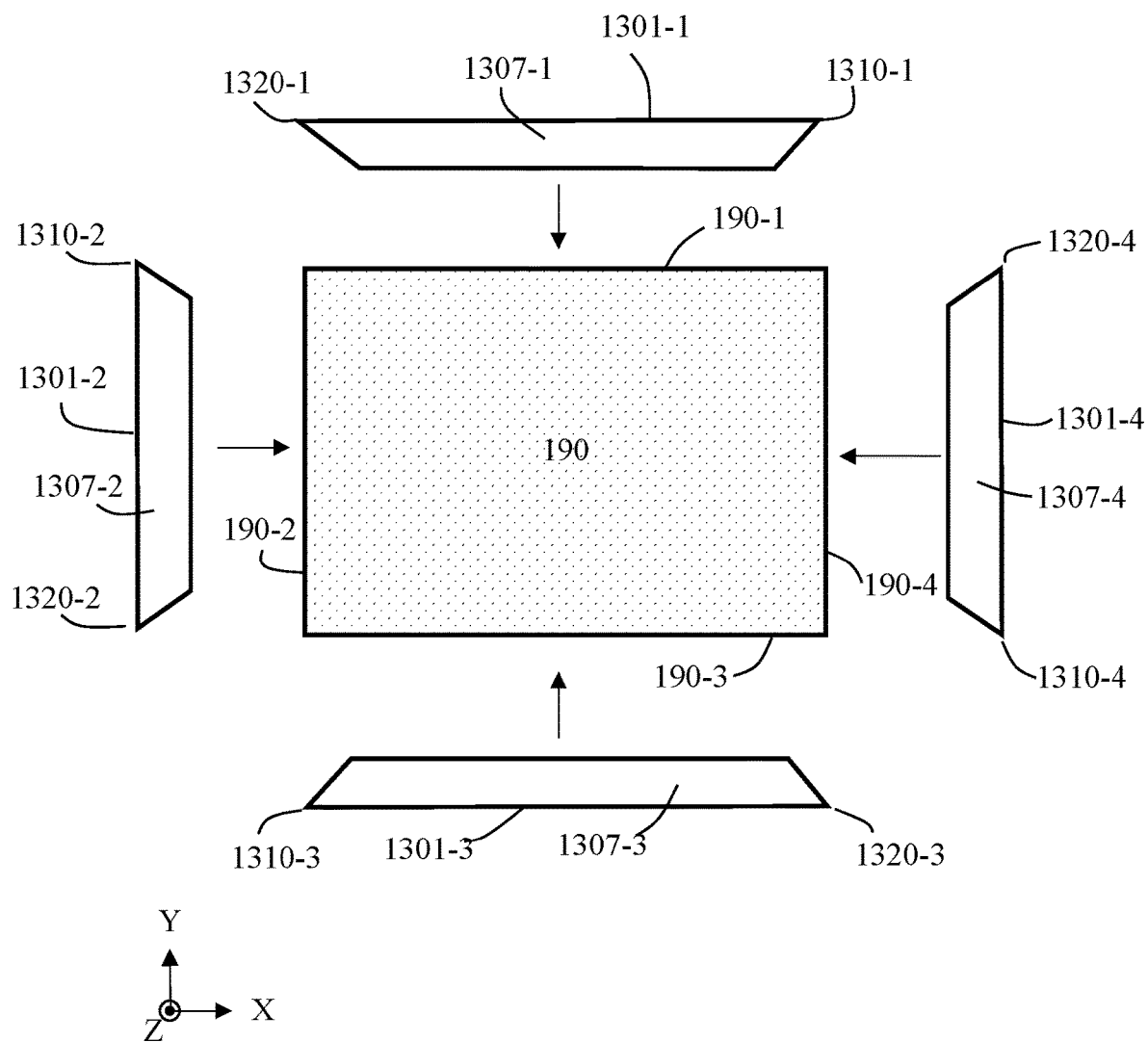
FIG. 13 is a plan view showing a non-limiting example of assembling a frame using four frame precursor structures according to some embodiments.

FIG. 13 is a plan view showing another non-limiting example of assembling a frame using four frame precursor structures according to some embodiments. Each frame precursor structure (each of which may also be referred to herein as a frame section) 1301-1, 1301-2, 1301-3, 1301-4 may optionally include any of the frame section features described elsewhere herein, such as a bottom flange, a side wall, and even a panel containment structure that may include a lower shelf, a pocket wall and a top lip. In some cases, one or more frame sections may further include a support wall extending from the bottom flange to the panel containment structure or to the frame sidewall as discussed elsewhere herein. In this view, only the top lip 1307-1, 1307-2, 1307-3, 1307-4 of each frame precursor structure is visible. Each frame precursor structure may have a first end 1310-1, 1310-2, 1310-3, 1310-4 and a second end 1320-1, 1320-2, 1320-3, 1320-4. When assembled, a first end of one frame precursor structure may form a corner joint with a second end of an adjacent frame precursor structure. Such corner joints may utilize any of the interlocking features described herein. As discussed with respect to FIG. 2E, the plan view of FIG. 13 may represent a view from above, or alternatively a view from below, or even a view from the side, depending on the nature of the assembly apparatus.

As indicated by the arrows, a first frame precursor structure may be designed to fit with or attach to a first panel edge 190-1 of panel 190, a second frame precursor structure 1301-2 may be designed to fit with or attach to a second panel edge 190-2, a third frame precursor structure 1301-3 may be designed to fit with third panel edge 190-3, and even a fourth frame precursor structure 1301-4 may be designed to fit with fourth panel edge 190-4. There are numerous variations regarding the sequence used to assemble the frame. In some embodiments, all four frame precursor structures are concurrently brought together with their respective panel edges and attached at approximately the same time. In some cases, attachment is sequential and may be in any order. In some embodiments, just two or three frame precursor structures are concurrently brought together with their respective panel edges and the remaining frame precursor structures are attached later or already pre-attached. In some embodiments, two or three of the frame precursor structures may be first attached to each other via a corner joint connection and then attached to the panel. In some cases, a frame precursor structure may initially be brought together with its respective panel edge at an angle rather than flush or parallel. In some cases, the choice of assembly sequence may in part be dependent upon the design of the corner joint and optional corner joint connection to be used.

In some embodiments, corner bend interlocking features or corners joint interlocking features may be supplemented with additional attachment features that may involve brackets, clinching, rivets, screws, nuts/bolts, welding, adhesives, or the like, or generally any attachment or strengthening feature disclosed in PCT application PCT/US2020/037092 filed on Jun. 10, 2020 and published as WO2020/252091A1, hereby incorporated by reference herein.

Figure 14A:
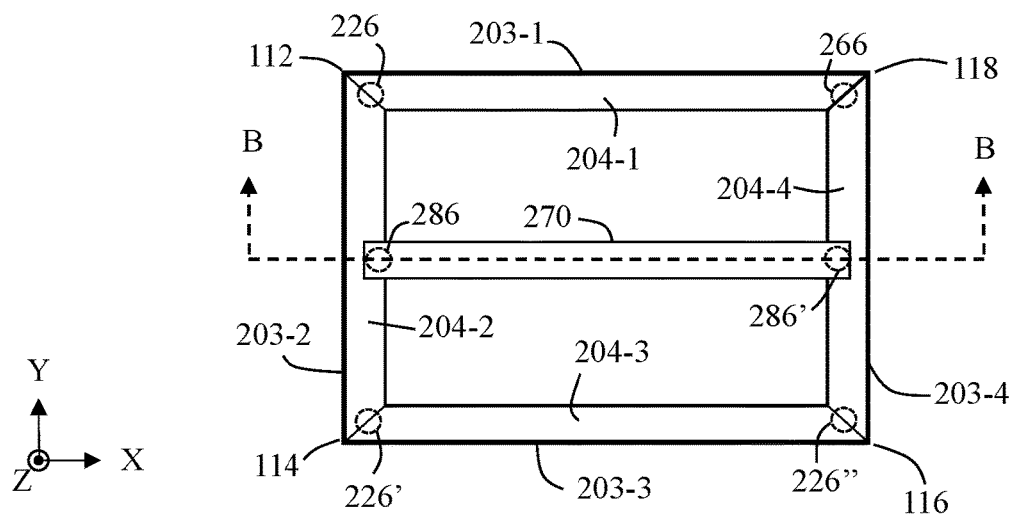
FIG. 14A is a plan view of a portion of a non-limiting example of a framed panel structure including a cross bar.
Figure 14B:
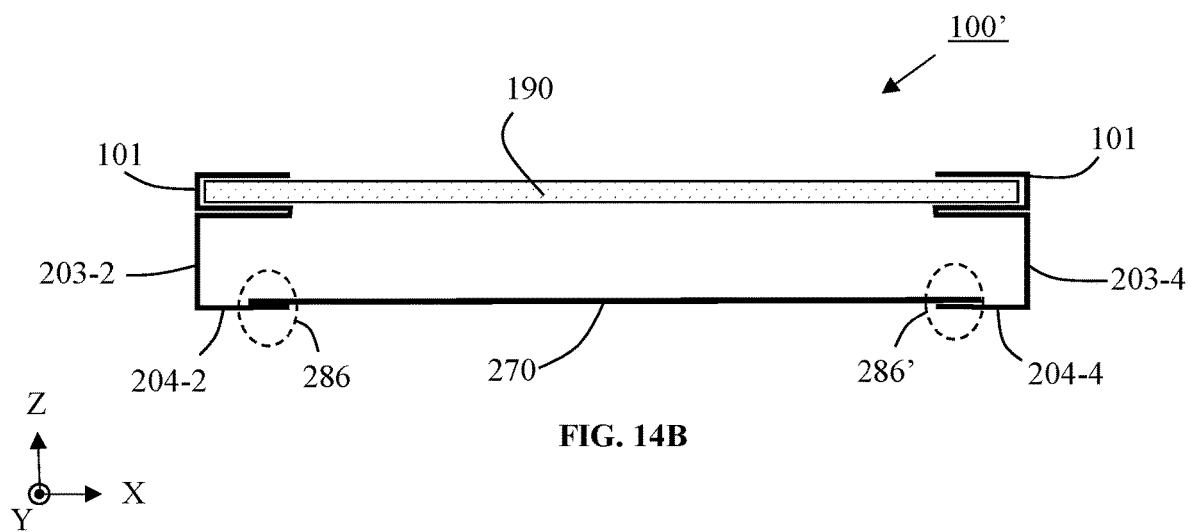
FIG. 14B is a cross-sectional view of FIG. 14A along cutline B-B.

In some embodiments, one or more cross bars (which may be referred to as mid-rails) may be added to a frame structure perhaps to further increase the strength of the framed panel structure. Interlocking structures described herein may be used to attach cross bars perhaps between opposing bottom flanges of the frame. To illustrate briefly, FIG. 14A is a plan view of a portion of framed panel 100' similar to that of FIG. 1 and which may optionally be made from a frame precursor structure as shown in FIG. 2A or any other frame precursor structure described herein. For clarity, and to generally illustrate cross bar 270, only the portions below the panel, the top lips and lower shelves are illustrated in FIG. 14A. A cross-sectional view along cutline B-B is provided in FIG. 14B, including the panel 190 and some other features omitted from FIG. 14A. First, second, third and fourth frame sections may include, respectively, frame sidewalls 203-1, 203-2, 203-3, 203-4 and bottom flanges 204-1, 204-2, 204-3, 204-4. A first corner bend 112 may include an optional interlocking feature such as corner bend interlocking feature 226 locking bottom flange 204-1 with 204-2. Similarly, at a second corner bend 114 there may be an optional corner bend interlocking feature 226' locking bottom flange 204-2 with 204-3, and at a third corner bend 116 there may be an optional a corner bend interlocking feature 226" locking bottom flange 204-3 with 204-4. At corner joint 118 there may be an optional corner joint interlocking feature 266 locking bottom flange 204-4 with 204-1. The interlocking feature 226, 226', 226" and 266 are not explicitly drawn and may include one or more of any of the interlocking features described herein. In some embodiments, any of the corner bends of FIG. 14A may instead be corner joints and may optionally include a corner joint interlocking feature.

The framed panel may include cross bar 270. In some embodiments, cross bar 270 may optionally be formed of the same framework material as used for the rest of the frame. The frame may include a cross bar interlocking feature 286 connecting one end of the cross bar to bottom flange 204-2 and a cross bar interlocking feature 286' connecting the other end of the cross bar to the opposite bottom flange 204-4. Note that a cross bar may instead, or in addition, connect bottom flanges 204-1 and 204-3. A cross bar may instead, or in addition, may extend between and connect adjacent bottom flanges, for example, 204-1 with 204-2. Cross bar interlocking features are not explicitly drawn and may include one or more of any of the interlocking features described herein. The skilled artisan will readily understand how to apply the interlocking features described in detail herein with respect to corner bends and corner joints. Cross bar interlocking features may include an opening, e.g., in the bottom flange, and even a locking element, e.g., provided as part of the cross bar. Alternatively, or in addition, the cross bar may include the opening and the bottom flange may include the locking element as previously described. The locking element may be received by the opening to lock the cross bar and bottom flanges in place. In some embodiments, the locking element may include a hook feature or a plug feature.

Figure 15:
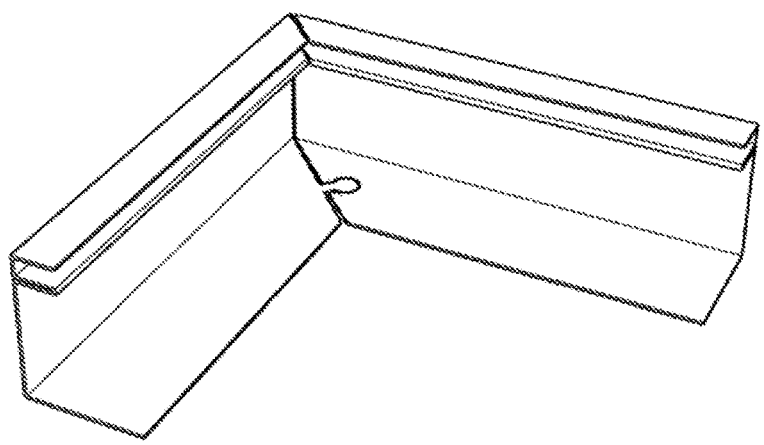
FIG. 15 is a perspective view of a portion of a non-limiting example of a frame illustrating an interlocking feature according to some embodiments.
Figure 16:
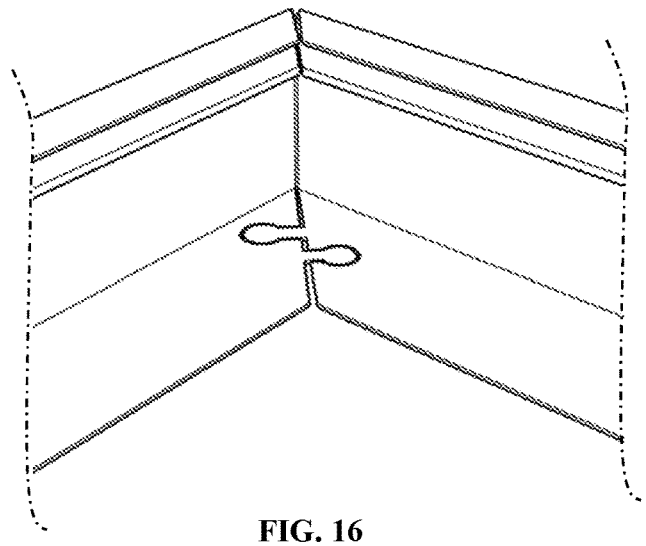
FIG. 16 is a perspective view of a portion of a non-limiting example of a frame illustrating an interlocking feature according to some embodiments.
Figure 17:
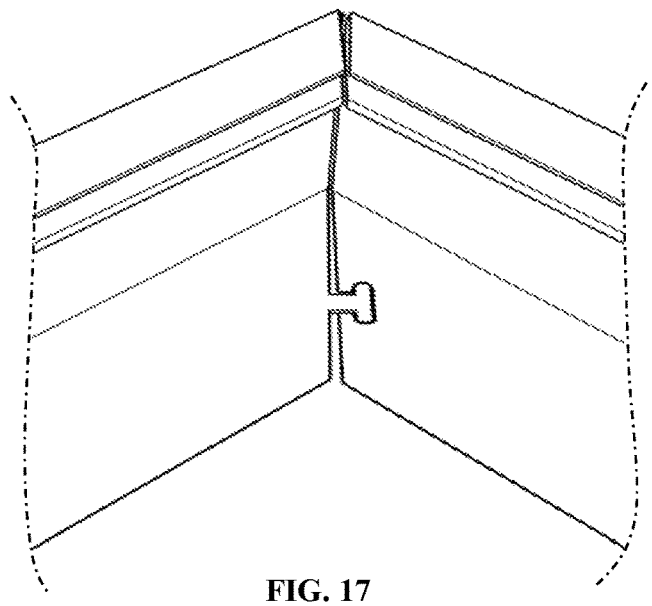
FIG. 17 is a perspective view of a portion of a non-limiting example of a frame illustrating an interlocking feature according to some embodiments.
Figure 18A:
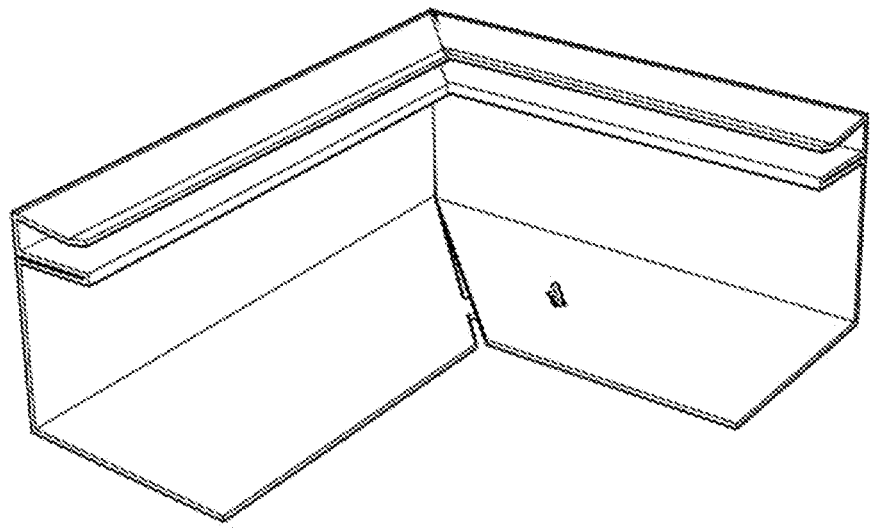
FIG. 18A is a perspective view from above of a portion of a non-limiting example of a frame illustrating an interlocking feature according to some embodiments.
Figure 18B:
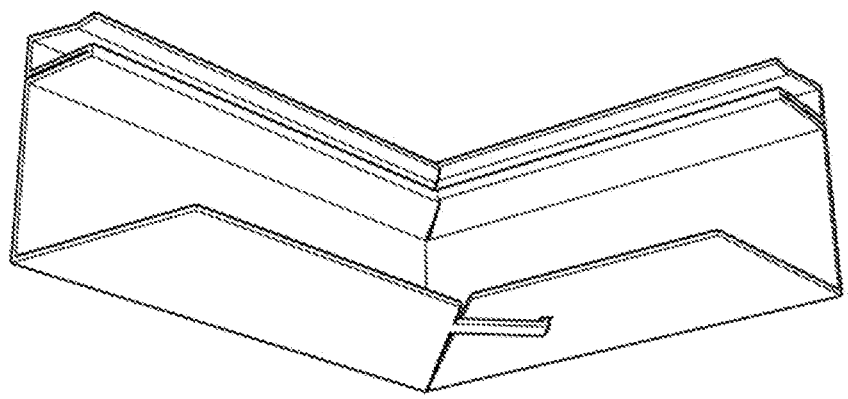
FIG. 18B is a perspective view from below of a portion of a non-limiting example of a frame illustrating an interlocking feature according to some embodiments.

For additional illustrative purposes, FIGS. 15-18B are perspective views of non-limiting examples of frame corners (applicable to a corner bend or to a corner joint) showing various interlocking features according to some embodiments. These figures further illustrate other frame features such as frame sidewalls and panel containment structures which may include a lower shelf, a pocket wall, and even a top lip. For clarity, the features are not labelled, but in combination with the other figures herein, the identity of each feature is self-evident. In FIG. 15, a single interlocking feature is shown where a locking element may be characterized as an extension of one bottom flange and fits into an opening on an adjacent bottom flange, the opening having a shape similar to that of the locking feature. FIG. 16 is similar to FIG. 15 but includes two interlocking features where one bottom flange has a locking element and an opening that mate with a corresponding opening and locking element of the adjacent bottom flange. FIG. 17 is similar to FIG. 15, but the shape at the end of the locking element is more oblong in appearance. FIG. 18A is a perspective view from above whereas FIG. 18B is from below illustrating an interlocking feature embodiment including a hook feature for some embodiments.

In some embodiments, frames, frame substructures and/or frame sections such as those illustrated in FIGS. 1A-2E by way of example may benefit from additional structural support features such as frame support substructures to improve the strength of the frame in some way to address various forces it may experience when used in a framed panel structure. For example, such additional support may enable the frame to hold larger panels (e.g., PV laminates), withstand greater environmental and/or handling forces (wind, snow, mounting, clamping, bending, torsional stresses or the like), or increase PV module lifetime by reducing the number or intensity of or stress points, or improving their distribution. In some cases, structural support features may enable the use of framework materials that are thinner, easier to handle, or less expensive.

In some embodiments a useful structural support feature which may be a frame support substructure may include a support wall extending (i) between the bottom flange and the frame sidewall, (ii) between the bottom flange and the lower shelf, or (iii) both (i) and (ii). In some cases, a frame or frame section including a support wall, bottom flange, sidewall, and lower shelf, may be advantageously produced from a single piece of framework material. In some cases, using a single piece of framework material for these features may simplify manufacturing thereby reducing costs and increasing throughput and yield. Such single piece manufacturing may also increase the lifetime of the frame by avoiding the many failure-prone attachments points that would be needed if these features were assembled from separate parts.

Figure 19A:
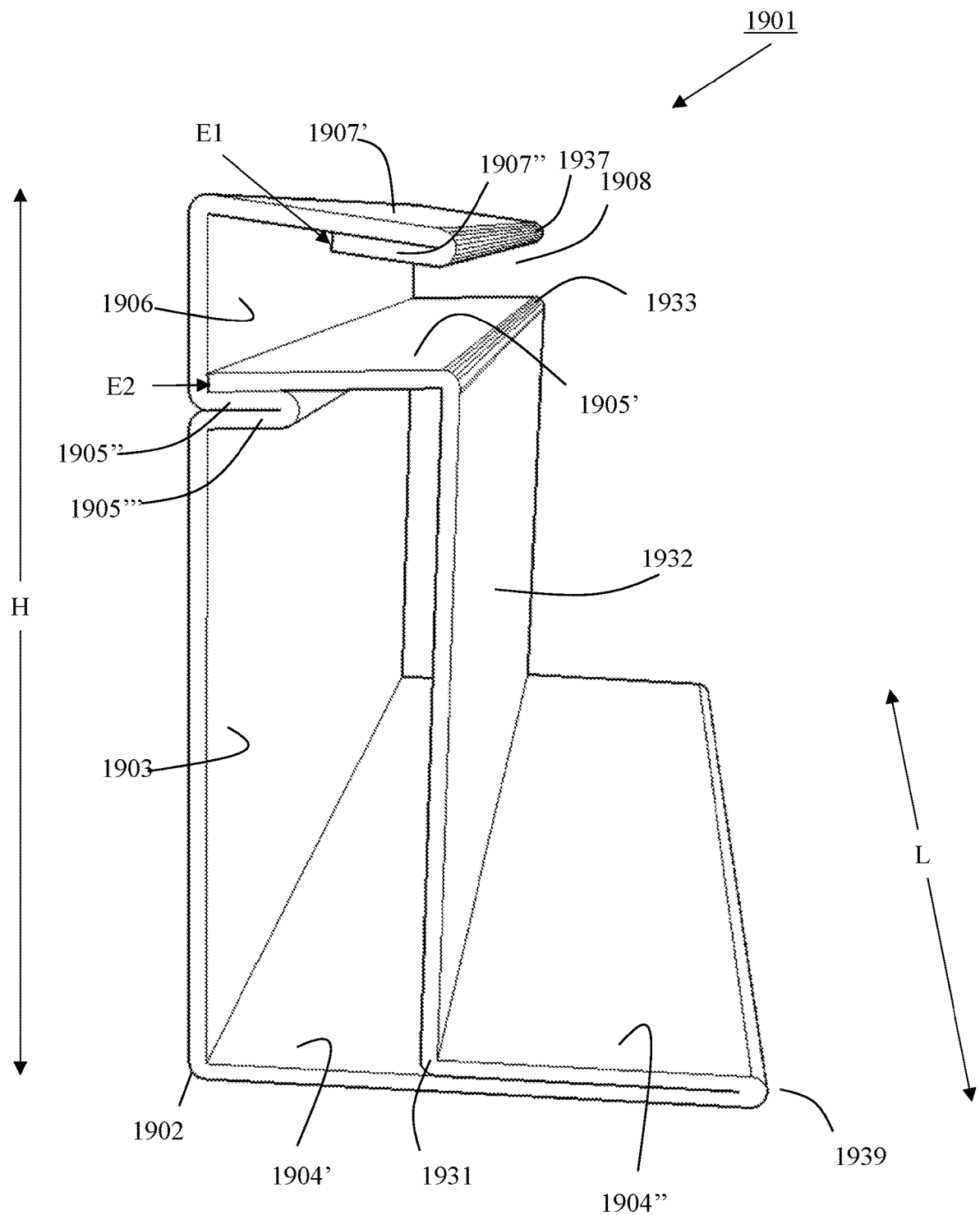
FIG. 19A is a perspective view of a cutaway portion of a non-limiting example of a frame section including a support wall according to some embodiments.
Figure 19B:
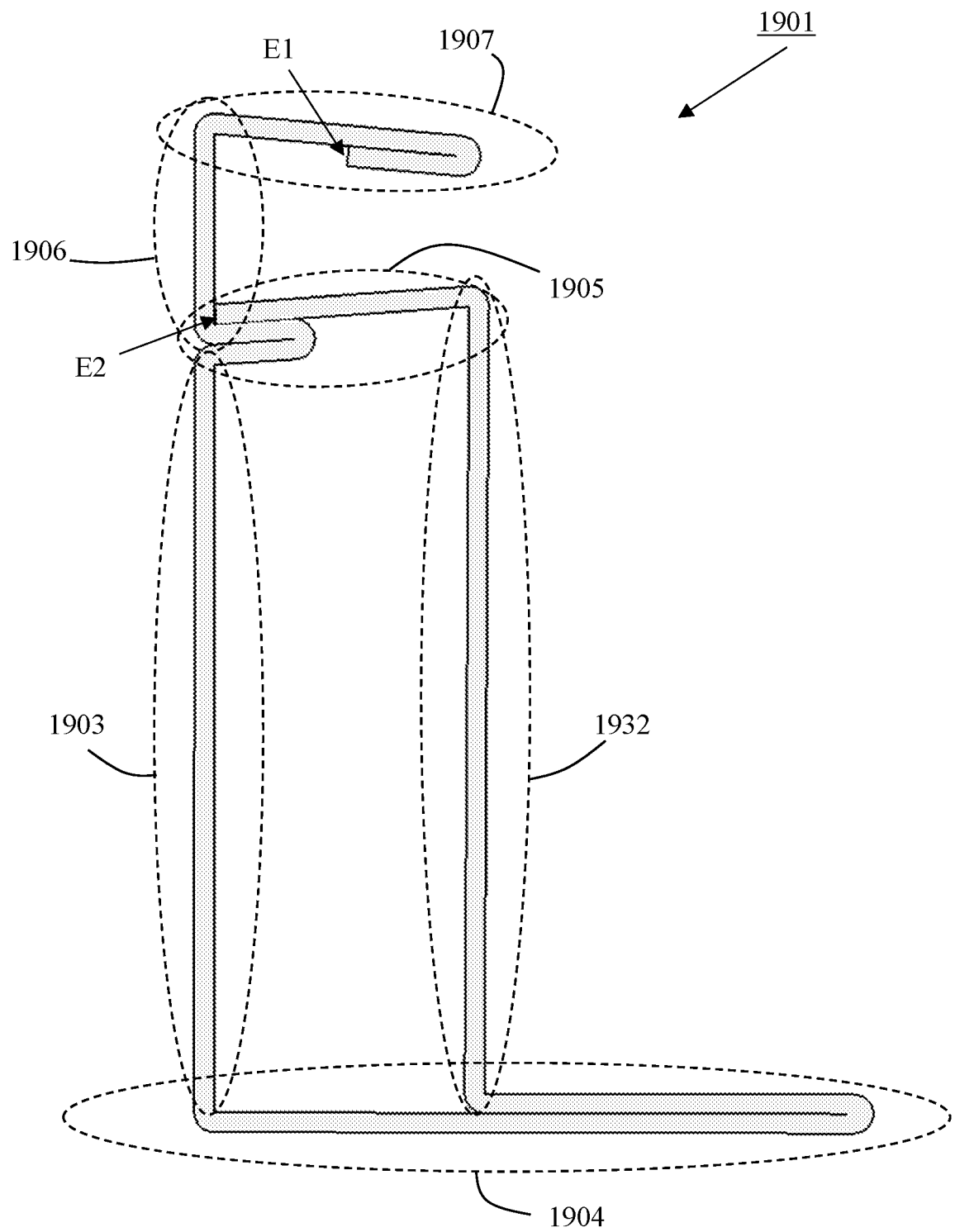
FIG. 19B is a cross-sectional view of the frame section from FIG. 2A according to some embodiments.

There are many embodiments of useful frame sections that include a support wall. FIG. 19A is a perspective view of a cutaway portion of a non-limiting example of a frame section including a support wall according to some embodiments. The height H and lengthwise L axes are also shown for reference. FIG. 19B is a cross-sectional view of the frame section from FIG. 19A but labelled in a modified manner to clarify that any of the features may include multiple layers of framework material. Frame section 1901 may include a framework material that has been cut and folded into a desired shape. Frame section 1901 may include a bottom flange 1904 provided at the base of the frame section, which in some embodiments may include multiple layers of framework material such as bottom flange layers 1904' and 1904". A frame sidewall 1903 may be provided at an outer portion of the frame section and characterized by a height extending from the bottom flange. In some embodiments, a lengthwise fold 1902 may define an intersection of the frame sidewall 1903 and the bottom flange 1904, e.g., with bottom flange layer 1904'. A panel containment structure may be provided at an upper portion of the frame sidewall. The panel containment structure may include at least a lower shelf 1905, and may also include a pocket wall 1906, a top lip 1907, and perhaps even a pocket region 1908 for containing the panel. In some embodiments, some or all of the lower shelf 1905 may include multiple layers of framework material, such as lower shelf layers 1905', 1905", 1905'". In some embodiments, two or more lower shelf layers may be formed from a fold in the framework material at the upper portion of the frame sidewall. In some cases, the lower shelf layers 1905" and 1905'" formed from the fold in framework material at the upper portion of the frame sidewall may be characterized as a panel containment support feature, upon which lower shelf layer 605' rests. In some embodiments, the top lip may be formed of multiple layers of framework material, such as top lip layer 1907' and top lip layer 1907" which may be formed from a top lip fold 1937 to form a multilayered rounded top lip edge. A support wall 1932 may be provided at an inner portion of the frame section (inner relative to the frame sidewall). In some embodiments, the support wall 1932 may extend between the bottom flange and the lower shelf. In some embodiments, the frame section may include a reversing flange fold 1939 such that a portion 1904' of the bottom flange may include a double layer of framework material. In some embodiments, another lengthwise fold 1931 may define an intersection of the support wall 1932 with the bottom flange structure, e.g., with portion 1904'. In some cases, a lengthwise fold 1933 may define an intersection of the support wall with the lower shelf 1905.

Figure 19C:
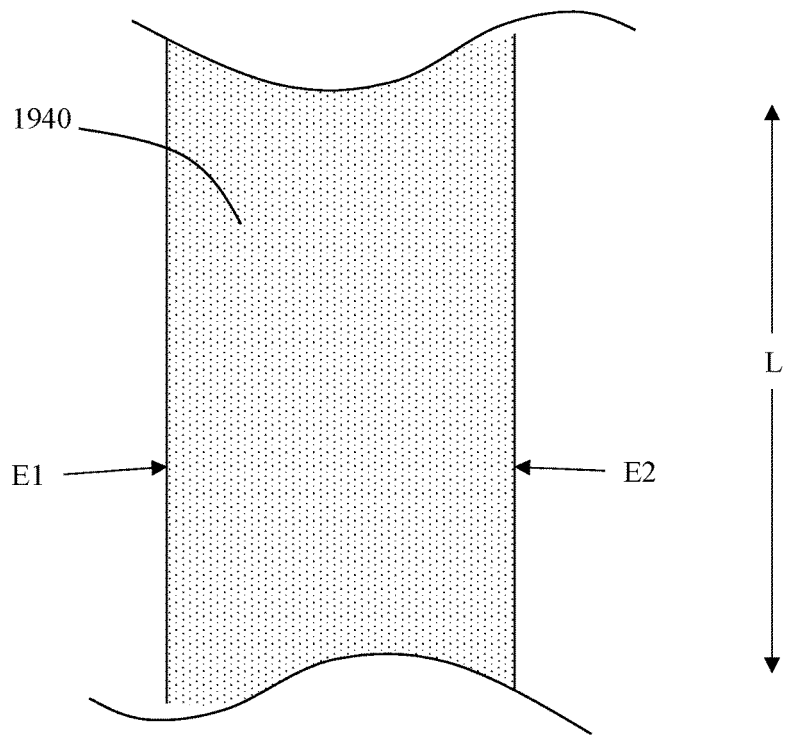
FIG. 19C is a plan view of a non-limiting example of a portion of framework material according to some embodiments.

FIG. 19C is a plan view of a non-limiting example of a portion of framework material 1940 prior to any cutting, punching, or folding operations that may be used to make the frame section 601. The lengthwise dimension of the framework material is illustrated as are a first edge E1 and second edge E2, which are also labelled in FIGS. 19A and 19B. In some embodiments, such as shown in FIGS. 19A and 19B, E1 may correspond to the end of top lip layer 607" and E2 may correspond to the end of lower shelf layer 1905'.

Figure 19D:
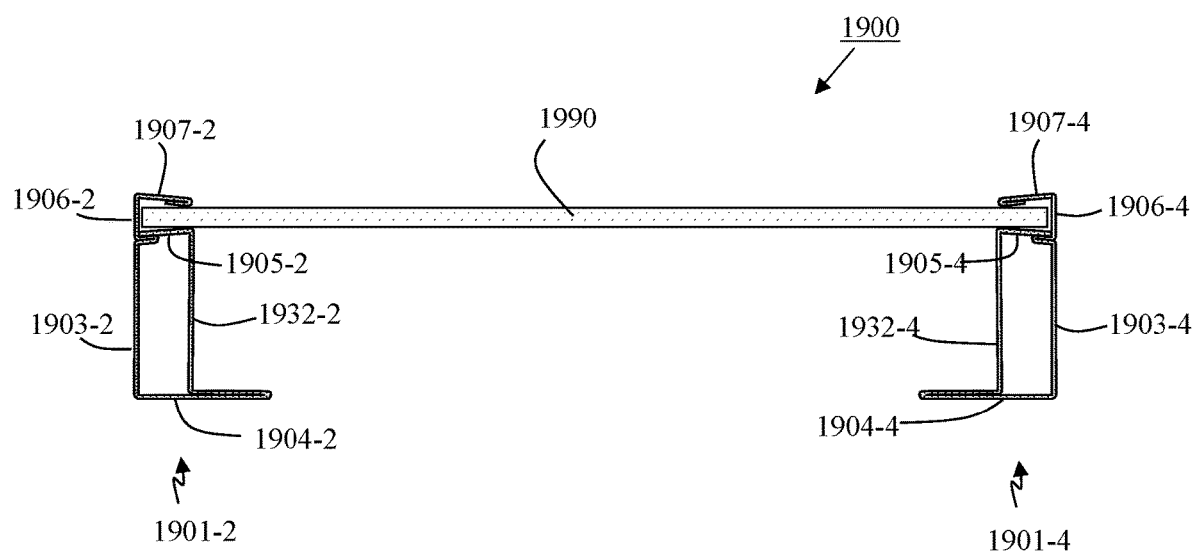
FIG. 19D is a cross-sectional view of a non-limiting example of a framed panel structure according to some embodiments.

FIG. 19D is a cross-sectional view of a non-limiting example of a framed panel structure according to some embodiments. Framed panel structure 1900 may include various frame sections as previously discussed, e.g., frame section 1901-2 and opposing frame section 1901-4. In some embodiments, each frame section may include a frame sidewall 1903-2, 1903-4, a bottom flange 1904-2, 1904-4, a lower shelf 1905-2, 1905-4, a pocket wall 1906-2, 1906-4, a top lip 1907-2, 1907-4, and a support wall 1932-2, 1932-4. The panel 1990 may be received into a portion of each pocket region (formed by the lower shelf, the pocket wall, and the top lip) and secured in place, optionally with a sealant that may have adhesive properties (not shown). The frame sidewall of a frame section may be characterized as provided at an outer portion of the frame section whereas the support wall of the same frame section may be characterized as provided at an inner portion of the frame section. An outer portion, in some embodiments, may provide that, relative to the support wall position, the frame sidewall may be generally provided further from the center of the panel. An inner portion, in some embodiments, may provide that, relative to the frame sidewall position, the support wall may be generally provided closer to the center of the panel. That is, an outer portion and an inner portion may be relative terms with respect to the frame sidewall and support wall, and do not necessarily mean the outermost part or innermost part of a frame section (although that may be the case in some embodiments).

Frames such as frame precursor structures having a frame section like FIG. 19A or 19B may sometimes be referred to herein as a box frame perhaps where the bottom flange, frame sidewall, lower shelf and support wall collectively form in cross-section an enclosed structure, in this case, one having four sides. However, a box frame may be any frame section that in cross section can form any enclosed shape. In some embodiments, the enclosed shape may involve at least the bottom flange, the frame sidewall, and the support wall, and may have three or more apparent sides in cross section. A box frame may in some cases include features as disclosed in U.S. Provisional Patent Application No. 63/176,824 filed on Apr. 19, 2021, entitled "FRAME SUPPORT SUBSTRUCTURES FOR SOLAR PANELS", and in U.S. Provisional Patent Application No. 63/288,556 filed on Dec. 11, 2021, entitled "FRAMES FOR SOLAR PANELS", the entire contents of which are incorporated herein by reference for all purposes.

In some embodiments, frames formed from frame sections or frame precursor structures having a box frame structure (for example, as in FIG. 19A) may employ an interlocking feature such as any of the interlocking features discussed herein, including corner bend interlocking features, corner joint interlocking features, even cross bar interlocking features, or the like.

In some cases, the frame precursor structure may be fabricated from an elongated sheet of the framework material that can be bendable and cuttable. The elongated sheet may be cut, for example, using a water cutter, a laser, a punch, a saw, or the like, depending on the framework material. The cuts may be used to form some of the various features described herein such as notches, holes, furrows or other features. After at least some of the cuts have been made, the elongated sheet may be folded to form at least a portion of the frame precursor structure. Such folding may include, but is not limited to, roll forming. In some embodiments, the cutting and folding processes may be applied to a coated steel-based framework material.

Figure 20:
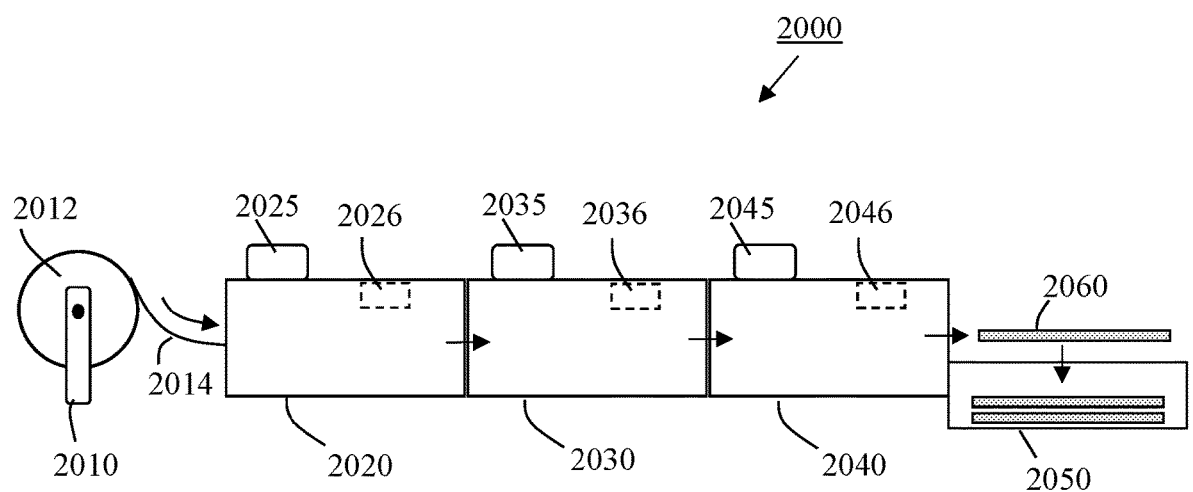
FIG. 20 is a schematic diagram of a non-limiting example of a manufacturing process line for making frame precursor structures according to some embodiments.

FIG. 20 is schematic diagram showing a non-limiting example of a manufacturing process line for making frame precursor structures according to some embodiments. Manufacturing process line 2000 may include a framework material station 2010 having framework material that may be fed into the next station. In some embodiments, the framework material may be in the form of sheets that are pre-cut to the final desired length. In some embodiments, the framework material may be fed continuously to the next station. For example, framework material station 2010 may include a coil 2012 of coated steel 2014. The coated steel 2014 may be supplied to punching station 2020. For example, the punching station 2020 may pull the coated steel 2014 from the coil. In some embodiments, certain cutting and/or punching processes may be performed at punching station 2020 to cut and/or remove predetermined sections of the framework material to make a patterned framework material. In some embodiments, the framework material may be cut to a desired length at the punching station, perhaps if such cut has not yet been performed. In some embodiments, the process may be controlled to high tolerances. Punching station 2020 may include a microprocessor 2025 and machine software and/or firmware that may control the cutting. Punching station 2020 may include one or more sensors 2026 that provide data to the microprocessor which may be used to monitor the punching processes or identify defects. The microprocessor 2025 may be in electronic communication with another microprocessor or with an external computer for sending or receiving data or instructions. Such electronic communication may be through cables or wireless methods.

After the punching station 2020, the patterned framework material, e.g., coated steel, may be received by a roll forming station 2030. The steel may be shaped in a linear fashion using multiple rollers that provide a graduated bending process to form the steel into the desired shape (shaped framework material). The design of the rollers, order of the rollers, and tolerances may be highly precise, and may result in a fully (or even nearly fully) shaped and punched frame precursor structure. Roll forming station 2030 may include a microprocessor 2035 and machine software and/or firmware that may control the roll forming. Roll forming station 2030 may include one or more sensors 2036 that provide data to the microprocessor which may be used to monitor the bending and folding processes or identify defects. The microprocessor 2035 may be in electronic communication with another microprocessor or with an external computer for sending or receiving data or instructions. Such electronic communication may be through cables or wireless methods. In some embodiments, the framework material may be cut to a desired length at the roll forming station, if such cut has not yet been performed. In some embodiments, the roll forming station may include an adhesive applicator tool to apply an appropriate adhesive to a predetermined portion of the framework material while shaping framework material, e.g., to help the shaped framework material to maintain its shape.

After the roll forming station 2030, the shaped framework material, e.g., coated steel, may be received by a post forming station 2040. Some non-limiting examples of post forming processes may include cutting the frame precursor structures to length, buffing/deburring, cleaning, or passing the frame precursor structures through straightening rollers or dies that may ensure product accuracy or the like. Post forming station 2040 may include a microprocessor 2045 and machine software and/or firmware that may control one or more post forming processes. Post forming station 2040 may include one or more sensors 2046 that provide data to the microprocessor which may be used to monitor the post forming processes or identify defects or out-of-tolerance parts. These data may be fed back to roll forming station 2030 for active adjustment of roll forming rollers or adjustment rollers. Post forming station 2040 may include a cleaning section. The microprocessor 2045 may be in electronic communication with another microprocessor or with an external computer for sending or receiving data or instructions. Such electronic communication may be through cables or wireless methods.

After the post forming station 2040, finished (or even nearly finished) frame precursor structures 2060 are received by a finished product station 2050. The frame precursor structures may be loaded into transportation containers and prepared for delivery, e.g., to a solar panel module production facility.

In some embodiments, the framework material may proceed in a generally linear (perhaps forward) direction from one station to the next. In some embodiments, the direction of framework material may be temporarily reversed within a station, for example, to repeat a particular step. In some embodiments, there may be multiple punching stations, roll forming stations, and/or post forming stations.

For any of the aforementioned stations, the microprocessor(s) may provide control signals to electro-mechanical motors that may be responsible for moving the intermediate products along the manufacturing line. Depending upon the process to be performed on the intermediate products, software/firmware running on the microprocessor(s) may dictate various factors/parameters of production. For merely some non-limiting examples, a microprocessor may dictate the speed and/or direction of the intermediate products traversing a given station. In some embodiments, a microprocessor may dictate when and/or how the intermediate products are to be shaped, punched, cut or the like in order to affect the desired intermediate/final products. In some embodiments, a microprocessor may receive signals from one or more sensors for monitoring manufacturing progress, identifying defects or out-of-tolerance parts, or measuring some other useful property of intermediate products as they are made. For example, an optical or imaging sensor(s) may provide data that allows a microprocessor to assess manufacturing status and/or how well a particular production step was performed. In some embodiments, if quality is below standard, a microprocessor may send a status alert signal to a system operator and/or to another microprocessor. Other sensors may also be useful to monitor manufacturing status and/or quality control metrics. In addition to optical and imaging sensors, non-limiting examples of potentially useful sensors or their components may include laser-based sensors (including, but not limited, to laser position sensors), vision systems (including, but not limited to vision measurement and shape vision systems), contact sensors (including, but not limited to contact position sensors), vibration sensors, thermal sensors, conductivity sensors, roughness sensors, profilometers, ultrasonic sensors, stress sensors, and the like.

In some embodiments, the frame or framed panel structure may be attached to a support structure that may hold the frame or framed panel structure in a predetermined position. Such support structures and systems may take many forms, but some non-limiting examples may include racking, rail mounts, pole mounts, tracking mounts, or non-tracking mounts, or the like. In combination with a support structure, a frame or framed panel structure may be attached to its intended target, including but not limited to, attachment to a building (e.g., a roof, a wall, an awning or the like), to the ground, to a shade structure or carport, or to a moving or stationary vehicle. In some embodiments, a frame or framed panel structure may be attached directly to its intended target without an intermediate support structure. In such case, the target itself may act as the support structure.

Although described herein with respect to their utility in making frames for solar panels, the methods, equipment, and devices of the present application may be used to manufacture many other products in many other fields. In some cases, such other products may be those formed at least in part from a generally flat starting material including, but not limited to, sheet metal, coated sheet metal, uncoated sheet metal, or the like.

It should be noted that various parts and frame features, including but not limited to, frame sidewalls and bottom flanges, have generally be represented in their respective figures as being straight or flat, but in some embodiments, one or more of these features (or other features shown as being straight or flat) may instead be non-straight or non-flat. For example, one or more of these features may include one or more curves or additional bends and still effectively perform their intended function.

Note also that in any of the figures herein, folds that may be represented as having sharp corners may be replaced with rounded corners. In some embodiments, a corner formed by a fold may be characterized by a bending radius.

In some embodiments, in areas where a portion of framework material may come into contact with another material including, but not limited to, another portion of framework material, a bolt, a washer, a support structure, or the like, such areas may optionally include an anti-corrosion coating or an additional anti-corrosion coating treatment including, but not limited to, those already discussed.

In some embodiments, in areas where multiple layers of framework material are formed, such areas may optionally include a bonding or attachment feature to hold the layers together. Some non-limiting examples of attachment features may include a crimp, a clinch, an interlocking feature between the layers, double-sided adhesive tape, an adhesive, a weld, a braze, a solder, or the like. In some embodiments, an anticorrosion coating may also have adhesive properties and act as an attachment feature.

Still further embodiments herein include the following enumerated embodiments. The term "including" (and its variations, "includes", "include") in these enumerated embodiments encompasses its normal meaning in addition to "comprising" ("comprises", "comprise") and/or "consisting of" ("consists of", "consist of") and/or "consisting essentially of" ("consists essentially of", consist essentially of").

ENUMERATED EMBODIMENTS

Enumerated embodiment 1. A frame precursor structure for use in forming a frame that encloses at least a portion of a panel having at least a first panel corner, the frame precursor structure including:

an elongated single piece of framework material having a first end and a second end, the first and second ends defining a lengthwise dimension;

a lengthwise fold defining an intersection of a frame sidewall with a bottom flange, wherein the frame sidewall is characterized by a height extending from the bottom flange;

a first corner bend precursor axis on the frame sidewall defining the interface of a first frame section with a second frame section, wherein the sidewall at the first corner bend precursor axis is bendable along its height axis; and a first notch at the first corner bend precursor axis separating the bottom flange of the first frame section from the bottom flange of the second frame section, wherein the bottom flange on one side of the first notch includes a locking element and the bottom flange on the other side of the first notch includes an opening designed to receive the locking element thereby forming a first corner bend interlocking feature when the frame precursor structure is bent at the first corner bend precursor axis to approximately the angle of the first panel corner.

Enumerated embodiment 2. The frame precursor structure of enumerated embodiment 1 or any other enumerated embodiment, wherein the bottom flange on the one side or the other side of the notch includes a second locking element, and the bottom flange includes a second opening on the side opposite the second locking element and designed to receive the second locking element thereby forming another corner bend interlocking feature.

Enumerated embodiment 3. The frame precursor structure of enumerated embodiment 1 or 2 or any other enumerated embodiment, further including:

a second corner bend precursor axis defining the interface of the second frame section with a third frame section, wherein the sidewall at the second corner bend precursor axis is bendable along its height axis; and a second notch at a second corner bend precursor axis separating the bottom flange of the second frame section from the flange of the third frame section, wherein the bottom flange on one side of the second notch includes a locking element and the bottom flange on the other side of the second notch includes an opening designed to receive the locking element thereby forming an interlocking feature when the frame precursor structure is bent at the first corner bend precursor axis to approximately the angle of a second panel corner.

Enumerated embodiment 4. The frame precursor structure of enumerated embodiment 3 or any other enumerated embodiment, further including:

a third corner bend precursor axis defining the interface of the third frame section with a fourth frame section, wherein the sidewall at the third corner bend precursor axis is bendable along its height axis; and a third notch at a third corner bend precursor axis separating the bottom flange of the third frame section from the flange of the fourth frame section, wherein the bottom flange on one side of the third notch includes a locking element and the bottom flange on the other side of the second notch includes an opening designed to receive the locking element thereby forming an interlocking feature when the frame precursor structure is bent at the first corner bend precursor axis to approximately the angle of a third panel corner.

Enumerated embodiment 5. The frame precursor structure according to any of enumerated embodiments 1-4 or any other enumerated embodiment, wherein the bottom flange at the first end includes either an opening or a locking element designed to form a corner joint interlocking feature with a complementary locking element or opening provided on either a bottom flange of the second end or on a bottom flange at an end of a second frame precursor structure.

Enumerated embodiment 6. The frame precursor structure according to any of enumerated embodiments 1-5 or any other enumerated embodiment, wherein at least one locking element includes a hook feature.

Enumerated embodiment 7. The frame precursor structure according to any of enumerated embodiments 1-6 or any other enumerated embodiment, wherein at least one locking element includes a plug feature.

Enumerated embodiment 8. The frame precursor structure according to any of enumerated embodiments 1-7 or any other enumerated embodiment, wherein at least one notch is characterized by a notch angle equal to about 180° minus the angle of the corresponding panel corner.

Enumerated embodiment 9. The frame precursor structure according to any of enumerated embodiments 1-8 or any other enumerated embodiment, further including a panel containment structure provided at an upper portion of the sidewall.

Enumerated embodiment 10. The frame precursor structure of enumerated embodiment 9 or any other enumerated embodiment, wherein the panel containment structure includes a pocket region formed from the framework material.

Enumerated embodiment 11. The frame precursor structure of enumerated embodiment 10 or any other enumerated embodiment, wherein the pocket region includes lengthwise folds in the framework material.

Enumerated embodiment 12. The frame precursor structure according to enumerated embodiment 10 or 11 or any other enumerated embodiment, wherein the pocket region includes:
 a lower shelf at the top of the frame sidewall and extending approximately parallel to the bottom flange;
 a pocket wall extending approximately parallel to the frame sidewall; and
 a top lip at the top of the pocket wall and extending approximately parallel to the bottom flange.

Enumerated embodiment 13. The frame precursor structure of enumerated embodiment 12 or any other enumerated embodiment, wherein the lower shelf includes the framework material folded back on itself.

Enumerated embodiment 14. The frame precursor structure according to any of enumerated embodiments 1-13 or any other enumerated embodiment, wherein the framework material includes coated steel.

Enumerated embodiment 15. The frame precursor structure of enumerated embodiment 14 or any other enumerated embodiment, wherein the coated steel has a thickness in a range of about 0.7 mm to about 1.4 mm.

Enumerated embodiment 16. The frame precursor structure according to any of enumerated embodiments 1-15 or any other enumerated embodiment, wherein the panel is a solar panel.

Enumerated embodiment 17. The frame precursor structure according to any of enumerated embodiments 1-16 or any other enumerated embodiment, wherein the panel is rectangular, square, or hexagonal.

Enumerated embodiment 18. A frame precursor structure for use in forming a frame that encloses at least a portion of a panel, the frame precursor structure including:
an elongated single piece of framework material having a first end and a second end, the first and second ends defining a lengthwise dimension;
a lengthwise fold defining an intersection of a frame sidewall with a bottom flange, wherein the frame sidewall is characterized by a height extending from the bottom flange; and
a first corner bend precursor axis on the frame sidewall defining the interface of a first frame section with a second frame section, wherein the sidewall at the first corner bend precursor axis is bendable along its height axis,
wherein the bottom flange at the first end includes either an opening or a locking element designed to form a corner joint interlocking feature with a complementary locking element or opening provided on either the bottom flange of the second end or a on a bottom flange at an end of a second frame precursor structure.

Enumerated embodiment 19. The frame precursor structure of enumerated embodiment 18 or any other enumerated embodiment, further including another locking element or another opening designed to form another corner joint interlocking feature with another complementary locking element or opening provided on either the bottom flange of the second end or on the bottom flange of the second frame precursor structure.

Enumerated embodiment 20. The frame precursor structure of enumerated embodiment 18 or 19 or any other enumerated embodiment, wherein at least one locking element includes a hook feature.

Enumerated embodiment 21. The frame precursor structure according to any of enumerated embodiments 18-20 or any other enumerated embodiment, wherein at least one locking element includes a plug feature.

Enumerated embodiment 22. The frame precursor structure according to any of enumerated embodiments 18-21 or any other enumerated embodiment, further including a panel containment structure provided at an upper portion of the sidewall.

Enumerated embodiment 23. The frame precursor structure of enumerated embodiment 22 or any other enumerated embodiment, wherein the panel containment structure includes a pocket region formed from the framework material.

Enumerated embodiment 24. The frame precursor structure of enumerated embodiment 23 or any other enumerated embodiment, wherein the pocket region includes lengthwise folds in the framework material.

Enumerated embodiment 25. The frame precursor structure according to enumerated embodiment 22 or 23 or any other enumerated embodiment, wherein the pocket region includes:
 a lower shelf at the top of the frame sidewall and extending approximately parallel to the bottom flange;
 a pocket wall extending approximately parallel to the frame sidewall; and
 a top lip at the top of the pocket wall and extending approximately parallel to the bottom flange.

Enumerated embodiment 26. The frame precursor structure of enumerated embodiment 25 or any other enumerated embodiment, wherein the lower shelf includes the framework material folded back on itself.

Enumerated embodiment 27. The frame precursor structure according to any of enumerated embodiments 18-26 or any other enumerated embodiment, wherein the framework material includes coated steel.

Enumerated embodiment 28. The frame precursor structure of enumerated embodiment 27 or any other enumerated embodiment, wherein the coated steel has a thickness in a range of about 0.7 mm to about 1.4 mm.

Enumerated embodiment 29. The frame precursor structure according to any of enumerated embodiments 18-28 or any other enumerated embodiment, wherein the panel is a solar panel.

Enumerated embodiment 30. The frame precursor structure according to any of enumerated embodiments 18-29 or any other enumerated embodiment, wherein the panel is rectangular, square, or hexagonal.

Enumerated embodiment 31. A framed panel structure including a panel having four sides and a frame made at least in part from a frame precursor structure according to any of enumerated embodiments 1-30, wherein the frame includes a panel containment structure enclosing the four sides of the panel.

Enumerated embodiment 32. The framed panel structure of enumerated embodiment 31 or any other enumerated embodiment, wherein the frame includes at least one corner bend and at least one corner joint.

Enumerated embodiment 33. The framed panel structure of enumerated embodiments 31 or 32 or any other enumerated embodiment, wherein the frame includes three corner bends and one corner joint.

Enumerated embodiment 34. The framed panel structure of enumerated embodiments 31 or 32 or any other enumerated embodiment, wherein the frame includes two corner bends and two corner joints.

Enumerated embodiment 35. The framed panel structure according to any of enumerated embodiments 31-34 or any other enumerated embodiment, wherein the frame includes at least one corner bend interlocking feature.

Enumerated embodiment 36. The framed panel structure according to any of enumerated embodiments 31-35 or any other enumerated embodiment, wherein the frame includes multiple corner bend interlocking features.

Enumerated embodiment 37. The framed panel structure of enumerated embodiment 36 or any other enumerated embodiment, wherein all of the multiple corner bend interlocking feature have substantially the same structure, or wherein at least one of the multiple corner bend interlocking features has a structure that is substantially different from another of the multiple corner bend interlocking features Enumerated embodiment 38. The framed panel structure according to any of enumerated embodiments 31-37 or any other enumerated embodiment, wherein the frame includes at least one corner joint interlocking feature.

Enumerated embodiment 39. The framed panel structure according to any of enumerated embodiments 31-38 or any other enumerated embodiment, wherein the frame includes multiple corner joint interlocking features.

Enumerated embodiment 40. The framed panel structure of enumerated embodiment 39 or any other enumerated embodiment, wherein all of the multiple corner joint interlocking feature have substantially the same structure, or wherein at least one of the multiple corner joint interlocking features has a structure that is substantially different from another of the multiple corner joint interlocking features.

Enumerated embodiment 41. The framed panel structure according to any of enumerated embodiments 31-40 or any other enumerated embodiment, further including a cross bar connecting a bottom flange on one side of the frame to a bottom flange on an opposite side of the frame.

Enumerated embodiment 42. The framed panel structure of enumerated embodiment 41 or any other enumerated embodiment, further including one or more cross bar interlocking features.

Enumerated embodiment 43. The framed panel structure according to any of enumerated embodiments 31-42 or any other enumerated embodiment, wherein at least one interlocking feature includes a hook element that is received into an opening.

Enumerated embodiment 44. The framed panel structure according to any of enumerated embodiments 31-43 or any other enumerated embodiment, wherein at least one interlocking feature includes a plug element that is received into an opening.

Enumerated embodiment 45. A frame for at least partially enclosing or supporting a panel having a first panel edge and a second panel edge meeting at a first panel corner, the frame including:
a first frame section including:
  a first framework material;
  a first bottom flange formed from the first framework material and provided at a base of the first frame section, the first bottom flange including one of a first locking element and a first opening;
  a first frame sidewall formed from the first framework material and provided at an outer portion of the frame section, the first frame sidewall characterized by a height extending from the first bottom flange; and
  a first panel containment structure at an upper portion of the first frame sidewall, the first panel containment structure including a first lower shelf; and
a second frame section adjacent the first frame section, the second frame section including:
  a second framework material;
  a second bottom flange formed from the first framework material and provided at a base of the second frame section, the second bottom flange including the other of a first locking element and a first opening, wherein the first opening is designed to receive the first locking element for forming a first corner interlocking feature between the first and second frame sections;
  a second frame sidewall formed from the second framework material and provided at an outer portion of the first frame section, the second frame sidewall characterized by a height extending from the second bottom flange; and
  a second panel containment structure at an upper portion of the second frame sidewall, the second panel containment structure including a second lower shelf.

Enumerated embodiment 46. The frame of enumerated embodiment 45 or any other enumerated embodiment, and further comprising a fold chosen from: a first lengthwise fold defining an intersection of the first frame sidewall with the first bottom flange; a second lengthwise fold defining an intersection of a second frame sidewall with a second bottom flange; and both a first lengthwise fold defining an intersection of the first frame sidewall with the first bottom flange and a second lengthwise fold defining an intersection of a second frame sidewall with a second bottom flange.

Enumerated embodiment 47. The frame of enumerated embodiment 45 or 46 or any other enumerated embodiment, further including a support wall chosen from:
a first support wall provided at an inner portion of the first frame section, the first support wall extending between components chosen from: between the first bottom flange and the first frame sidewall; between the first bottom flange and the first lower shelf; and both between the first bottom flange and the first frame sidewall and between the first bottom flange and the first lower shelf;
a second support wall provided at an inner portion of the second frame section, the second support wall extending between components chosen from: between the second bottom flange and the second frame sidewall; between the second bottom flange and the second lower shelf; and both between the second bottom flange and the second frame sidewall and between the second bottom flange and the second lower shelf; and
the first support wall and the second support wall.

Enumerated embodiment 48. The frame according to any of enumerated embodiments 45-47 or any other enumerated embodiment, wherein the first frame sidewall and first bottom flange form a first angle, the second frame sidewall and second bottom flange form a second angle, and wherein the first angle and second angle are independently selected and within a range of about 45° to 135°.

Enumerated embodiment 49. The frame of enumerated embodiment 48 or any other enumerated embodiment, wherein the first angle and second angle are independently selected and within a range of about 85° to about 95°.

Enumerated embodiment 50. The frame according to any of enumerated embodiments 45-49 or any other enumerated embodiment, further including a second locking element included on one the first and second bottom flanges, and a second opening included on the other of the first and second bottom flanges, wherein the second opening is designed to receive the second locking element for forming a second corner interlocking feature between the first and second frame sections.

Enumerated embodiment 51. The frame according to any of enumerated embodiments 45-50 or any other enumerated embodiment, wherein at least one locking element includes a hook feature.

Enumerated embodiment 52. The frame according to any of enumerated embodiments 45-51 or any other enumerated embodiment, wherein at least one locking element includes a plug feature.

Enumerated embodiment 53. The frame according to any of enumerated embodiments 45-52 or any other enumerated embodiment, wherein the first frame section and second frame section are formed from separate pieces of framework material; wherein the first frame sidewall is discontinuous with second frame sidewall; and wherein at least one corner interlocking feature is a corner joint interlocking feature.

Enumerated embodiment 54. The frame according to any of enumerated embodiments 45-52 or any other enumerated embodiment, wherein the first frame section and the second frame section are formed from a common piece of framework material; wherein the first frame sidewall is contiguous with the second frame sidewall; and wherein at least one corner interlocking feature is a corner bend interlocking feature.

Enumerated embodiment 55. The frame according to any of enumerated embodiments 45-54 or any other enumerated embodiment, wherein at least a portion of the first bottom flange, the second bottom flange, the first frame sidewall, the second frame sidewall, the first lower shelf, or the second lower shelf, or any combination thereof, includes at least two layers of framework material.

Enumerated embodiment 56. The frame according to any of enumerated embodiments 45-55 or any other enumerated embodiment, wherein the first panel containment structure further includes a first pocket wall extending from the first lower shelf; wherein the second panel containment structure further includes a second pocket wall extending from the second lower shelf; or both wherein the first panel containment structure further includes a first pocket wall extending from the first lower shelf and wherein the second panel containment structure further includes a second pocket wall extending from the second lower shelf.

Enumerated embodiment 57. The frame according to enumerated embodiment 56 or any other enumerated embodiment, wherein at least a portion of the first pocket wall, the second pocket wall, or both the first and second pocket walls, includes at least two layers of framework material.

Enumerated embodiment 58. The frame of enumerated embodiment 56 or 57 or any other enumerated embodiment, wherein the first panel containment structure further includes a first top lip intersecting an upper portion of the first pocket wall, thereby forming a first pocket region for receiving a first edge of a panel, the first pocket region defined by the first lower shelf, the first pocket wall, and the first top lip; or wherein the second panel containment structure further includes a second top lip intersecting an upper portion of the second pocket wall, thereby forming a second pocket region for receiving a second edge of a panel, the second pocket region defined by the second lower shelf, the second pocket wall, and the second top lip; or both wherein the first panel containment structure further includes a first top lip intersecting an upper portion of the first pocket wall, thereby forming a first pocket region for receiving a first edge of a panel, the first pocket region defined by the first lower shelf, the first pocket wall, and the first top lip and wherein the second panel containment structure further includes a second top lip intersecting an upper portion of the second pocket wall, thereby forming a second pocket region for receiving a second edge of a panel, the second pocket region defined by the second lower shelf, the second pocket wall, and the second top lip.

Enumerated embodiment 59. The frame of enumerated embodiment 58 or any other enumerated embodiment, wherein at least a portion of the first top lip, the second top lip, or both the first and second top lips, include at least two layers of framework material.

Enumerated embodiment 60. The frame according to any of enumerated embodiments 45-59 or any other enumerated embodiment, wherein the first framework material includes coated steel, the second framework material includes coated steel, or both the first framework materials include coated steel.

Enumerated embodiment 61. The frame of enumerated embodiment 60 or any other enumerated embodiment, wherein the coated steel has a thickness in a range of about 0.7 mm to about 1.4 mm.

Enumerated embodiment 62. The frame according to any of enumerated embodiments 45-61 or any other enumerated embodiment, further including third and fourth frame sections, each independently selected to be the same as, or different than, the first frame section.

Enumerated embodiment 63. A framed panel structure including:
a frame according to any of enumerated embodiments 45-62; and
a panel including a first panel edge, a second panel edge, and a first panel corner formed at the intersection of the first panel edge with the second panel edge,
wherein at least the first panel edge is received by the first panel containment structure.

Enumerated embodiment 64. The framed panel structure of enumerated embodiment 63 or any other enumerated embodiment, wherein the second panel edge is received by the second panel containment structure.

Enumerated embodiment 65. The framed panel structure of enumerated embodiment 63 or 64 or any other enumerated embodiment, wherein the panel is a solar panel.

Enumerated embodiment 66. The framed panel structure according to any of enumerated embodiments 63-65 or any other enumerated embodiment, wherein the panel is rectangular, square, or hexagonal.

Enumerated embodiment 67. A method of making a frame precursor structure for use in a frame according to any of enumerated embodiments 1-30 or 45-62, the method including:

providing framework material to a framework materials station;

receiving the framework material at a punching station, wherein the framework material is cut or punched in a predetermined pattern to form a patterned framework material; and receiving the patterned framework material at a roll forming station, wherein the patterned framework material is folded or bent into a predetermined shape to form a shaped framework material.

Enumerated embodiment 68. The method of enumerated embodiment 67 or any other enumerated embodiment, wherein the shaped framework material is the frame precursor structure.

Enumerated embodiment 69. The method of enumerated embodiment 67 or any other enumerated embodiment, further including:

receiving the shaped framework material at a post forming station, wherein the shaped framework material is acted on by one or more post forming processes to form the framework precursor structure.

Enumerated embodiment 70. The method of enumerated embodiment 69 or any other enumerated embodiment, wherein the one or more post forming processes include:

cutting the frame precursor structure to a predetermined length;

passing the shaped framework material through straightening rollers; or buffing or deburring the shaped framework material.

Enumerated embodiment 71. The method according to any of enumerated embodiments 67-70 or any other enumerated embodiment, wherein the framework material is provided in the form of a roll.

As can be easily understood from the foregoing, the basic concepts of the various embodiments of the application may be embodied in a variety of ways. It involves both frame panel structure techniques as well as devices to accomplish the appropriate frame panel structure. In this application, the frame panel structure techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the application and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the application and each element performs. Neither the description nor the terminology is intended to limit the scope of the claims that will be included in any subsequent patent application. As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth.

It should also be understood that a variety of changes may be made without departing from the essence of the various embodiments of the application. Such changes are also implicitly included in the description. They still fall within the scope of the various embodiments of the application. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the application both independently and as an overall system.

Further, each of the various elements of embodiments of the application and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the application, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the application is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "bend" should be understood to encompass disclosure of the act of "bending"—whether explicitly discussed or not—and, conversely, were there effectively disclosure of the act of "bending", such a disclosure should be understood to encompass disclosure of a "bend" and even a "means for bending." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of the various embodiments of application such statements are expressly not to be considered as made by the applicant(s).

REFERENCES TO BE INCORPORATED BY REFERENCE

| FOREIGN PATENT DOCUMENTS | | | | |
|---|---|---|---|---|
| Foreign Document No. | Country Code | Kind Code | Publication Date | Name of Patentee |
| 2020252091 | WO | A1 | 2020 Dec. 17 | Origami Solar |

| NON PATENT LITERATURE DOCUMENTS |
|---|
| U.S. Provisional Patent Application No. 63/176,803, filed Apr. 19, 2021. First named inventor: Hafter. |

Thus, the applicant(s) should be understood to have support to claim and make a statement of embodiments of application to at least: i) each of the frame structure devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent applications, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all applications described herein. In addition, the applicant(s) should be understood to have support to claim and make a statement of application that may include claims directed to any of the enumerated embodiments and any permutation or combination thereof.

In addition and as to computer aspects and each aspect amenable to programming or other electronic automation, it should be understood that in characterizing these and all other aspects of the various embodiments of the application—whether characterized as a device, a capability, an element, or otherwise, because all of these can be implemented via software, hardware, or even firmware structures as set up for a general purpose computer, a programmed chip or chipset, an ASIC, application specific controller, subroutine, logic, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines, processor logic, and/or programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

We claim:

1. A frame for at least partially enclosing or supporting a solar panel having a first panel edge and a second panel edge meeting at a first panel corner, the frame comprising:
   a first frame section comprising:
      a first framework material;
      a first bottom flange formed from the first framework material and provided at a base of the first frame section, the first bottom flange comprising one of a first locking element and a first opening;
      a first frame sidewall formed from the first framework material and provided at an outer portion of the frame section, the first frame sidewall characterized by a height extending from the first bottom flange; and
      a first panel containment structure at an upper portion of the first frame sidewall,
      the first panel containment structure comprising a first lower shelf; and
   a second frame section adjacent the first frame section, the second frame section comprising:
      a second framework material;
      a second bottom flange formed from the first framework material and provided at a base of the second frame section, the second bottom flange comprising the other of a first locking element and a first opening, wherein the first opening is designed to receive the first locking element for forming a first corner interlocking feature between the first and second frame sections and for restricting multidirectional movement between the first bottom flange and the second bottom flange in at least two axes of a plane of the first and second bottom flanges when locked;
      a second frame sidewall formed from the second framework material and provided at an outer portion of the first frame section, the second frame sidewall characterized by a height extending from the second bottom flange; and
      a second panel containment structure at an upper portion of the second frame sidewall, the second panel containment structure comprising a second lower shelf.

2. The frame of claim 1, and further comprising a fold chosen from:
   a first lengthwise fold defining an intersection of the first frame sidewall with the first bottom flange;
   a second lengthwise fold defining an intersection of a second frame sidewall with a second bottom flange; and
   both a first lengthwise fold defining an intersection of the first frame sidewall with the first bottom flange and a second lengthwise fold defining an intersection of a second frame sidewall with a second bottom flange.

3. The frame of claim 1, further comprising a support wall chosen from:
   a first support wall provided at an inner portion of the first frame section, the first support wall extending between components chosen from:
      between the first bottom flange and the first frame sidewall;
      between the first bottom flange and the first lower shelf; and
      both between the first bottom flange and the first frame sidewall and between the first bottom flange and the first lower shelf;
   a second support wall provided at an inner portion of the second frame section, the second support wall extending between components chosen from:
      between the second bottom flange and the second frame sidewall;
      between the second bottom flange and the second lower shelf; and
      both between the second bottom flange and the second frame sidewall and between the second bottom flange and the second lower shelf; and
   both the first support wall and the second support wall.

4. The frame of claim 1, further comprising a second locking element on one the first and second bottom flanges, and a second opening on the other of the first and second bottom flanges, wherein the second opening is designed to receive the second locking element for forming a second corner interlocking feature between the first and second frame sections.

5. The frame of claim 1, wherein at least one locking element comprises a hook feature.

6. The frame of claim 1, wherein at least one locking element comprises a plug feature.

7. The frame of claim 1, wherein the first frame section and second frame section are formed from separate pieces of framework material; wherein the first frame sidewall is discontinuous with second frame sidewall; and wherein at least one corner interlocking feature is a corner joint interlocking feature.

8. The frame of claim 1, wherein the first frame section and the second frame section are formed from a common piece of framework material; wherein the first frame sidewall is contiguous with the second frame sidewall; and wherein at least one corner interlocking feature is a corner bend interlocking feature.

9. The frame of claim 1, wherein at least a portion of the first bottom flange, the second bottom flange, the first frame sidewall, the second frame sidewall, the first lower shelf, or the second lower shelf, or any combination thereof, comprises at least two layers of framework material.

10. The frame of claim 1, wherein the first panel containment structure further comprises a first pocket wall extending from the first lower shelf;
    wherein the second panel containment structure further comprises a second pocket wall extending from the second lower shelf; or
    both wherein the first panel containment structure further comprises a first pocket wall extending from the first lower shelf and wherein the second panel containment structure further comprises a second pocket wall extending from the second lower shelf.

11. The frame of claim 10, wherein at least a portion of the first pocket wall, the second pocket wall, or both the first and second pocket walls, comprises at least two layers of framework material.

12. The frame of claim 10, wherein the first panel containment structure further comprises a first top lip intersecting an upper portion of the first pocket wall, thereby forming a first pocket region for receiving a first edge of a panel, the first pocket region defined by the first lower shelf, the first pocket wall, and the first top lip; or
    wherein the second panel containment structure further comprises a second top lip intersecting an upper portion of the second pocket wall, thereby forming a second pocket region for receiving a second edge of a panel, the second pocket region defined by the second lower shelf, the second pocket wall, and the second top lip; or both wherein the first panel containment structure further comprises a first top lip intersecting an upper portion of the first pocket wall, thereby forming a first pocket region for receiving a first edge of a panel, the first pocket region defined by the first lower shelf, the first pocket wall, and the first top lip and wherein the second panel containment structure further comprises a second top lip intersecting an upper portion of the second pocket wall, thereby forming a second pocket region for receiving a second edge of a panel, the second pocket region defined by the second lower shelf, the second pocket wall, and the second top lip.

13. The frame of claim 12, wherein at least a portion of the first top lip, the second top lip, or both the first and second top lips, comprise at least two layers of framework material.

14. The frame of claim 1, wherein the first framework material comprises coated steel, the second framework material comprises coated steel, or both the first framework materials comprise coated steel.

15. The frame of claim 14, wherein the coated steel has a thickness in a range of about 0.5 mm to about 1.4 mm.

16. The frame of claim 1, further comprising third and fourth frame sections, each independently selected to be the same as, or different than, the first frame section.

17. A framed panel structure comprising:
a frame of claim 1; and
a panel comprising a first panel edge, a second panel edge, and a first panel corner formed at the intersection of the first panel edge with the second panel edge,
wherein at least the first panel edge is received by the first panel containment structure.

18. The framed panel structure of claim 17, wherein the second panel edge is received by the second panel containment structure.

19. The framed panel structure of claim 17, wherein the panel is a solar panel.

20. The framed panel structure of claim 17, wherein the panel is rectangular, square, or hexagonal.

21. The frame of claim 1, wherein the first opening can only receive the first locking element by non-planar movement between the first locking element into the first opening.

* * * * *